United States Patent
Yamamoto

(10) Patent No.: US 8,427,763 B2
(45) Date of Patent: Apr. 23, 2013

(54) LENS SYSTEM, OPTICAL DEVICE WITH LENS SYSTEM, AND METHOD OF MANUFACTURING LENS SYSTEM

(75) Inventor: Sayako Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 649 days.

(21) Appl. No.: 12/369,776

(22) Filed: Feb. 12, 2009

(65) Prior Publication Data
US 2009/0273851 A1    Nov. 5, 2009

Related U.S. Application Data

(60) Provisional application No. 61/071,257, filed on Apr. 18, 2008, provisional application No. 61/071,259, filed on Apr. 18, 2008.

(30) Foreign Application Priority Data

| Feb. 12, 2008 | (JP) | 2008-030561 |
| Apr. 9, 2008 | (JP) | 2008-100935 |
| Apr. 9, 2008 | (JP) | 2008-100936 |

(51) Int. Cl.
*G02B 9/64* (2006.01)

(52) U.S. Cl.
USPC .......................... 359/755; 359/754

(58) Field of Classification Search .................. 359/751, 359/754–758
See application file for complete search history.

(56) References Cited

U.S. PATENT DOCUMENTS

| 5,636,067 A | 6/1997 | Shimizu |
| 6,246,833 B1 | 6/2001 | Harada |
| 6,493,157 B1 * | 12/2002 | Shinohara ............ 359/751 |

FOREIGN PATENT DOCUMENTS

| JP | 51-37246 A | 3/1976 |
| JP | 1-302311 A | 12/1989 |
| JP | H5-142469 | 6/1993 |
| JP | H5-224119 | 9/1993 |
| JP | H6-235858 | 8/1994 |
| JP | 2000-231056 | 8/2000 |
| JP | 2001-108895 | 4/2001 |
| JP | 2001-337265 | 12/2001 |
| JP | 2005-234564 A | 9/2005 |
| JP | 2007-192973 | 8/2007 |

OTHER PUBLICATIONS

Office Action, Notice of Reason for Refusal dated Aug. 16, 2012, for Japanese Patent Application No. 2008-030516.
Office Action, Notice of Reason for Rejection dated Aug. 16, 2012, for Japanese Patent Application No. 2008-100935.
Office Action, Notice of Reason for Refusal dated Aug. 2, 2012, for Japanese Patent Application No. 2008-100936.

\* cited by examiner

*Primary Examiner* — James Greece
(74) *Attorney, Agent, or Firm* — Miles & Stockbridge P.C.

(57) ABSTRACT

A lens system comprises, on a side closest to an object, a first lens component having a positive refractive power and a second lens component having a positive refractive power in order from the object; and on a side closest to an image, a cemented lens constructed by cementing together a positive lens and a negative lens in order from the object; wherein the lens system satisfies the following conditional expressions:

$(n1+n2)/2>1.49$ $(v1+v2)/2>60$ where $n1$ and $v1$ denote a refractive index and an Abbe number of the first lens component at d-line, respectively, and $n2$ and $v2$ denote a refractive index and an Abbe number of the second lens component at d-line, respectively.

14 Claims, 24 Drawing Sheets

LENS SYSTEM, OPTICAL DEVICE WITH LENS SYSTEM, AND METHOD OF MANUFACTURING LENS SYSTEM

BACKGROUND OF THE INVENTION

1. Field of the Invention

The present invention relates to a lens system, an optical device equipped with the lens system, and a method of manufacturing lens system.

2. Related Background Art

As a lens type which has a relatively bright f-number and easily achieves high optical performances in photographic cameras, video cameras, and the like, so-called Gaussian lenses have been known conventionally and in wide use now (see, for example, Japanese Patent Application Laid-Open No. 1-302311).

SUMMARY OF THE INVENTION

However, the conventional lenses have a problem in that chromatic aberration, such as secondary spectrum in particular, may not be corrected sufficiently.

In view of such a problem, it is an object of the present invention to provide a lens system which has an f-number of about 1.2 and can favorably correct various aberrations, such as chromatic aberration in particular, of the whole picture, thereby exhibiting high optical performances over the whole picture.

For purposes of summarizing an embodiment of the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

In one aspect, the present invention provides a lens system comprising, on a side closest to an object, a first lens component having a positive refractive power and a second lens component having a positive refractive power in order from the object and, on a side closest to an image, a cemented lens constructed by cementing together a positive lens and a negative lens in order from the object, the lens system satisfying the following conditional expressions:

$$(n1+n2)/2>1.49$$

$$(v1+v2)/2>60$$

where $n1$ and $v1$ denote a refractive index and an Abbe number of the first lens component at d-line, respectively, and $n2$ and $v2$ denote a refractive index and an Abbe number of the second lens component at d-line, respectively.

In such a lens system, each of the first and second lens components may have a meniscus form with a convex surface facing the object.

Such a lens system may further comprise a front-side negative lens component having a negative refractive power, an aperture stop, a rear-side negative lens component having a negative refractive power, and a rear-side positive lens component having a positive refractive power in order from the object between the second lens component and the cemented lens.

Such a lens system may further comprise a third lens component having a meniscus form with a convex surface facing the object between the second lens component and the front-side negative lens component.

In such a lens system, the front-side negative lens component may be a fourth lens component having a meniscus form with a convex surface facing the object, while the rear-side negative lens component may be a fifth lens component having a double concave form.

Such a lens system may further comprise a seventh lens component having a positive refractive power between a sixth lens component as the rear-side positive lens component and the cemented lens.

In such a lens system, the rear-side negative lens component and the rear-side positive lens component may be cemented together so as to form a cemented lens.

Such a lens system may satisfy the following conditional expressions:

$$n8>n9$$

$$v8>v9$$

where $n8$ and $v8$ denote a refractive index and an Abbe number of the positive lens in the cemented lens arranged closest to the image at d-line, respectively, and $n9$ and $v9$ denote a refractive index and an Abbe number of the negative lens in the cemented lens arranged closest to the image at d-line, respectively.

Such a lens system may satisfy the following conditional expression:

$$0.3<r8/f<0.5$$

where $r8$ denotes a radius of curvature of an image-side surface of the front-side negative lens component, and f denotes a focal length of the lens system as a whole.

In such a lens system, the cemented lens arranged closest to the image may be moved at a speed different from that of another lens along an optical axis upon focusing.

Such a lens system may satisfy the following conditional expression:

$$1<f89/f<2$$

where $f89$ denotes a focal length of the cemented lens arranged closest to the image, and f denotes a focal length of the lens system as a whole.

In such a lens system, the positive lens in the cemented lens arranged closest to the image may have a double convex form.

The present invention provides an optical device equipped with any of the lens systems mentioned above.

In another aspect, the present invention provides a lens system comprising, in order from an object, a front-side lens group having a positive refractive power and a rear-side lens group having a positive refractive power; wherein the front-side lens group comprises, in order from the object, a first lens component having a positive refractive power, a second lens component having a positive refractive power, a third lens component having a positive refractive power, a fourth lens component having a negative refractive power, an aperture stop, a fifth lens component having a negative refractive power, a sixth lens component having a positive refractive power, and a seventh lens component having a positive refractive power; wherein the rear-side lens group includes a cemented lens constructed by cementing together a positive lens and a negative lens in order from the object; wherein, upon focusing from infinity to the object at a short distance, the front-side lens group and the rear-side lens group move along an optical axis by respective amounts of movement different from each other so as to increase a distance between the front-side lens group and the rear-side lens group; and wherein the lens system satisfies the following conditional expression:

0.79<fF/fR<1.58 where fF denotes a focal length of the front-side lens group, and fR denotes a focal length of the rear-side lens group.

In such a lens system, the front-side lens group and the rear-side lens group may move by respective ratios of movement different from each other along the optical axis upon focusing from an intermediate shooting distance to the object at the short distance.

Such a lens system may satisfy the following conditional expression:

0.78<(−f9)/f<1.59 where f9 denotes a focal length of the negative lens in the rear-side lens group, and f denotes a focal length of the lens system as a whole.

In such a lens system, the fifth lens component may have a double concave form, while the sixth lens component may have a double convex form.

In such a lens system, the seventh lens component may be a positive lens having a double convex form.

In such a lens system, the seventh lens component may be a positive meniscus lens having a convex surface facing an image.

In still another aspect, the present invention provides a lens system comprising, in order from an object, a front-side lens group having a positive refractive power and a rear-side lens group having a positive refractive power; wherein the front-side lens group comprises, in order from a side closest to the object, a first lens component having a positive refractive power and a second lens component having a positive refractive power; wherein the rear-side lens group comprises a cemented lens constructed by cementing together a positive lens and a negative lens in order from the object; and wherein the lens system satisfies the following conditional expressions:

(ν1+ν2)/2>60

0.35<γR1/γF1<0.80 where ν1 denotes an Abbe number of the first lens component at d-line, ν2 denotes an Abbe number of the second lens component at d-line, γF1 denotes an amount of movement of the front-side lens group upon focusing from infinity to a magnification of −0.01, and γR1 denotes an amount of movement of the rear-side lens group upon focusing from infinity to the magnification of −0.01.

In such a lens system, the front-side lens group and the rear-side lens group may move by respective ratios of movement different from each other along an optical axis upon focusing from an intermediate shooting distance to the object at a short distance.

In such a lens system, the lens system may satisfy the following conditional expression:

0.35<γR2/γF2<0.50 where γF2 and γR2 denote respective amounts of movement of the front- and rear-side lens groups upon focusing from infinity to a magnification of −0.07.

In still another aspect, the present invention provides a lens system comprising, in order from an object, a front-side lens group having a positive refractive power and a rear-side lens group having a positive refractive power; wherein the front-side lens group comprises, on the object side of an aperture stop, a first lens group having a positive refractive power and a second lens group having a positive refractive power;

wherein the rear-side lens group comprises a cemented lens constructed by cementing together a positive lens and a negative lens in order from the object; and wherein the lens system satisfies the following conditional expressions:

(ν1+ν2)/2>60

0.35<γR1/γF1<0.80 where ν1 denotes an Abbe number of the first lens component at d-line, ν2 denotes an Abbe number of the second lens component at d-line, γF1 denotes an amount of movement of the front-side lens group upon focusing from infinity to a magnification of −0.01, and γR1 denotes an amount of movement of the rear-side lens group upon focusing from infinity to the magnification of −0.01.

In such a lens system, the front-side lens group and the rear-side lens group may move by respective ratios of movement different from each other along an optical axis upon focusing from an intermediate shooting distance to the object at a short distance.

In such a lens system, the lens system may satisfy the following conditional expression:

0.35<γR2/γF2<0.50 where γF2 and γR2 denote respective amounts of movement of the front- and rear-side lens groups upon focusing from infinity to a magnification of −0.07.

In still another aspect, the present invention provides a method of manufacturing a lens system, the method comprising the steps of: arranging, on a side closest to an object, a first lens component having a positive refractive power and a second lens component having a positive refractive power in order from the object; and arranging, on a side closest to an image, a cemented lens constructed by cementing together a positive lens and a negative lens in order from the object; wherein the lens system satisfies the following conditional expressions:

(n1+n2)/2>1.49

(ν1+ν2)/2>60 where n1 and ν1 denote a refractive index and an Abbe number of the first lens component at d-line, respectively, and n2 and ν2 denote a refractive index and an Abbe number of the second lens component at d-line, respectively.

In such a method of manufacturing a lens system, the lens system may further comprise a front-side negative lens component having a negative refractive power, an aperture stop, a rear-side negative lens component having a negative refractive power, and a rear-side positive lens component having a positive refractive power in order from the object between the second lens component and the cemented lens.

In such a method of manufacturing a lens system, the cemented lens arranged closest to an image may be moved at a speed different from that of another lens along an optical axis upon focusing.

In still another aspect, the present invention provides a method of manufacturing a lens system, the method comprising the steps of arranging a front-side lens group having a positive refractive power and a rear-side lens group having a positive refractive power in order from an object; and focusing from infinity to the object at a short distance by moving the front-side lens group and the rear-side lens group along an optical axis by respective amounts of movement different from each other so as to increase a distance between the front-side lens group and the rear-side lens group; wherein the front-side lens group comprises, in order from the object, a first lens component having a positive refractive power, a second lens component having a positive refractive power, a third lens component having a positive refractive power, a fourth lens component having a negative refractive power, an aperture stop, a fifth lens component having a negative refractive power, a sixth lens component having a positive refractive power, and a seventh lens component having a positive refractive power; wherein the rear-side lens group includes a cemented lens constructed by cementing together a positive lens and a negative lens in order from the object; and wherein the lens system satisfies the following conditional expression:

$$0.79 < fF/fR < 1.58$$

where fF denotes a focal length of the front-side lens group, and fR denotes a focal length of the rear-side lens group.

In such a method of manufacturing a lens system, the front-side lens group and the rear-side lens group may move by respective ratios of movement different from each other along the optical axis upon focusing from an intermediate shooting distance to the object at the short distance.

In such a method of manufacturing a lens system, the lens system may satisfy the following conditional expression:

$$0.78 < (-f9)/f < 1.59$$

where f9 denotes a focal length of the negative lens in the rear-side lens group, and f denotes a focal length of the lens system as a whole.

In still another aspect, the present invention provides a method of manufacturing a lens system, the method comprising the steps of arranging a front-side lens group having a positive refractive power and including, in order from an object, a first lens component having a positive refractive power and a second lens component having a positive refractive power, and a rear-side lens group having a positive refractive power and including a cemented lens constructed by cementing together a positive lens and a negative lens in order from the object; and moving the front-side lens group so as to focus from infinity to a magnification of −0.01; wherein the lens system satisfies the following conditional expressions:

$$(\nu 1 + \nu 2)/2 > 60$$

$$0.35 < \gamma R1/\gamma F1 < 0.80$$

where ν1 denotes an Abbe number of the first lens component at d-line, ν2 denotes an Abbe number of the second lens component at d-line, γF1 denotes an amount of movement of the front-side lens group upon focusing from infinity to a magnification of −0.01, and γR1 denotes an amount of movement of the rear-side lens group upon focusing from infinity to the magnification of −0.01.

In such a method of manufacturing a lens system, the lens system may satisfy the following conditional expression:

$$0.35 < \gamma R2/\gamma F2 < 0.50$$

where γF2 and γR2 denote respective amounts of movement of the front- and rear-side lens groups upon focusing from infinity to a magnification of −0.07.

In still another aspect, the present invention provides a method of manufacturing a lens system, the method comprising the steps of arranging, on an object side of an aperture stop, a front-side lens group having a positive refractive power and including a first lens component having a positive refractive power and a second lens component having a positive refractive power, and a rear-side lens group having a positive refractive power and including a cemented lens constructed by cementing together a positive lens and a negative lens in order from the object; and moving the front-side lens group so as to focus from infinity to a magnification of −0.01; wherein the lens system satisfies the following conditional expressions:

$$(\nu 1 + \nu 2)/2 > 60$$

$$0.35 < \gamma R1/\gamma F1 < 0.80$$

where ν1 denotes an Abbe number of the first lens component at d-line, ν2 denotes an Abbe number of the second lens component at d-line, γF1 denotes an amount of movement of the front-side lens group upon focusing from infinity to a magnification of −0.01, and γR1 denotes an amount of movement of the rear-side lens group upon focusing from infinity to the magnification of −0.01.

In such a method of manufacturing a lens system, the lens system may satisfy the following conditional expression:

$$0.35 < \gamma R2/\gamma F2 < 0.50$$

where γF2 and γR2 denote respective amounts of movement of the front- and rear-side lens groups upon focusing from infinity to a magnification of −0.07.

When constructed as in the foregoing, the lens system, the optical device equipped with the lens system, and the method of manufacturing the lens system in accordance with the present invention can yield a lens system which has an f-number of about 1.2 and can favorably correct various aberrations, such as chromatic aberration in particular, of the whole picture, thereby exhibiting high optical performances over the whole picture.

DESCRIPTION OF THE PREFERRED EMBODIMENTS

First Embodiment

Figure 1:
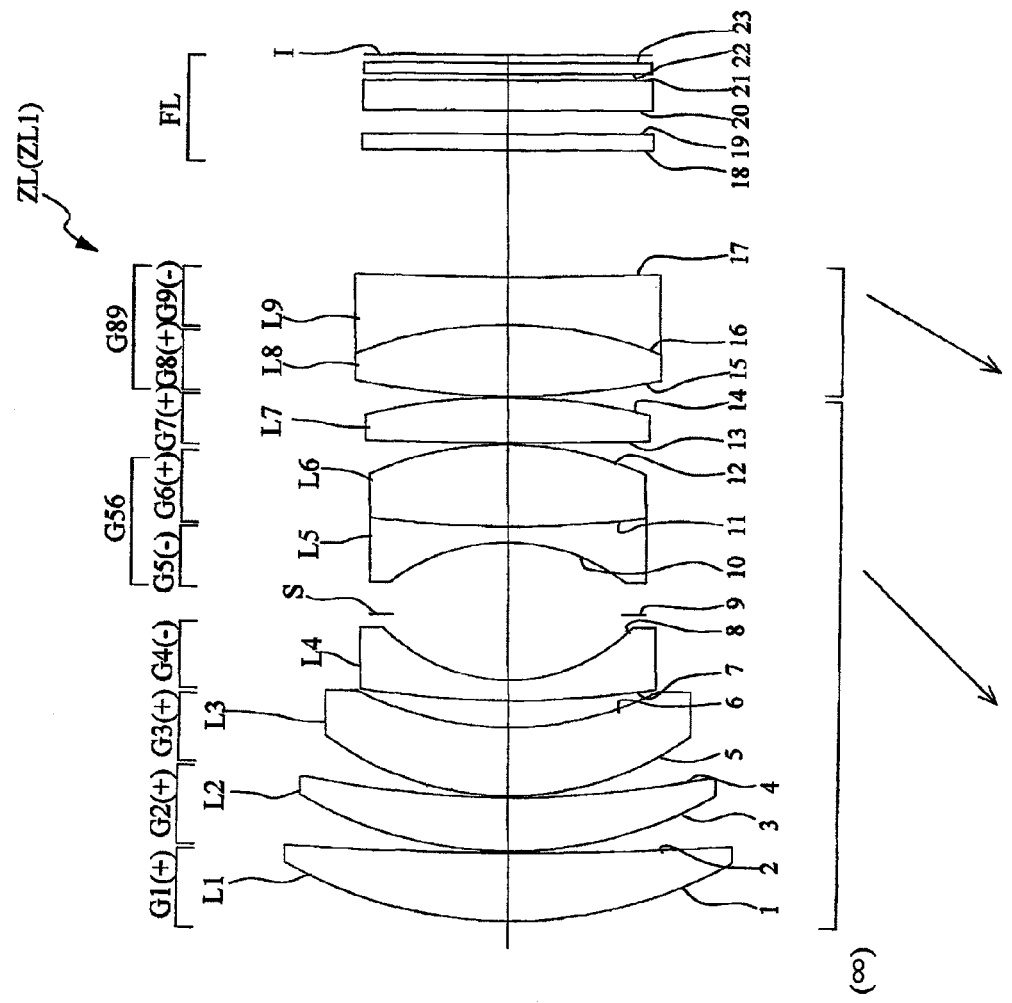
FIG. 1 is a sectional view showing the structure of the lens system in accordance with Example 1.

In the following, a preferred first embodiment of the present invention will be explained with reference to the drawings. As shown in FIG. 1, this lens system ZL comprises, in order from an object along an optical axis, a first lens component G1 having a positive refractive power, a second lens component G2 having a positive refractive power, and a cemented lens G89 which is positioned closest to an image and constructed by cementing together a positive lens G8 and a negative lens G9 in order from the object. Such a structure allows the lens system ZL to become a large-aperture lens having an effective diameter on the order of 25 to 30 mm. Since the cemented lens G89 constructed by cementing the positive lens G8 and negative lens G9 together is arranged as the lens closest to the image, the image-side lens also exhibits an achromatic effect, whereby the lens system ZL as a whole can correct the chromatic aberration. Such a cemented lens can prevent light beams from being totally reflected, so that the light beams can favorably pass through the lens.

As shown in FIG. 1, a specific preferred mode of the lens system ZL comprises not only the above-mentioned first lens component G1, second lens component G2, and cemented lens G89, but also, in order from the object between the image side of the second lens component G2 and the object side of the cemented lens G89, a third lens component G3 having a meniscus form with a convex surface facing the object, a front-side negative lens component G4 having a negative refractive power, an aperture stop S, a cemented lens G56 constructed by cementing together a rear-side negative lens component G5 having a negative refractive power and a rear-side positive lens component G6 having a positive refractive power, and a seventh lens component G7 having a positive refractive power, so as to be composed of nine lenses in seven groups.

The lens system ZL is a modification of a so-called Gaussian lens system. The Gaussian lens system has a form substantially symmetrical about a stop, thereby making it easy to correct distortion and the like. As in the Japanese Patent Application Laid-Open No. 1-302311, three lens components (first to third lens components G1 to G3 in FIG. 1) are arranged on the object side of the negative meniscus lens (front-side negative lens component G4 in FIG. 1) positioned closer to the object than is the aperture stop S in the lens system ZL, so as to increase their respective radii of curvature, thereby suppressing the occurrence of spherical aberration.

Preferably, each of the first lens component G1 and second lens component G2 in the lens system ZL has a meniscus form with a convex surface facing the object. Preferably, the front-side negative lens component G4 as the fourth lens component has a meniscus form with a convex surface facing the object. Preferably, the rear-side negative lens component G5 as the fifth lens component has a double concave form. Preferably, the positive lens G8 in the cemented lens G89 arranged closest to the image has a double convex form.

When arranging the third lens component G3 having a positive or negative refractive power between the second lens component G2 and the front-side negative lens component G4 as mentioned above, the third lens component G3 is preferably composed of one or two lenses. When the seventh lens component G7 is arranged between the rear-side negative lens component G5 and the cemented lens G89, the seventh lens component G7 is preferably composed of one or two lenses and preferably has a positive refractive power.

Conditions for constructing such a lens system ZL will now be explained. First, the lens system ZL is constructed such as to satisfy the following conditional expressions (1) and (2):

$$(n1+n2)/2 > 1.49 \quad (1)$$

$$(v1+v2)/2 > 60 \quad (2)$$

where $n1$ and $v1$ denote the refractive index and Abbe number of the first lens component G1 at d-line, respectively, and $n2$ and $v2$ denote the refractive index and Abbe number of the second lens component G2 at d-line, respectively.

The conditional expressions (1) and (2) are conditions for defining the refractive power and dispersion of the two meniscus lens components G1, G2 on the object side. Satisfying the conditional expressions (1) and (2) at the same time can make the dispersion smaller than typical materials relative to the refractive index and favorably correct chromatic aberration. In particular, coma on the lower side can favorably be corrected. Satisfying the conditional expressions (1) and (2) can also be effective in correcting chromatic aberration in the Gaussian lens system ZL in which the lens component on the object side is greatly influential in the occurrence of chromatic aberration.

Preferably, assuming that $n8$ and $v8$ denote the refractive index and Abbe number of the positive lens in the cemented lens arranged closest to the image at d-line, respectively, and $n9$ and $v9$ denote the refractive index and Abbe number of the negative lens in the cemented lens arranged closest to the image at d-line, respectively, the lens system ZL satisfies the following conditional expressions (3) and (4):

$$n8 > n9 \quad (3)$$

$$v8 > v9 \quad (4)$$

The conditional expressions (3) and (4) are conditions for defining the refractive powers and dispersions of the positive lens G8 and negative lens G9 in the cemented lens G89 arranged closest to the image. Satisfying the conditional expression (3) can prevent the Petzval sum from increasing. Satisfying the conditional expression (4) can correct chromatic aberration. If a material having a high refractive index is used for the positive lens G8 in order to suppress the occurrence of coma and spherical aberration, the dispersion will increase, whereby the negative lens G9 will tend to have a high refractive index for correcting chromatic aberration. This will increase the Petzval sum. Hence, when the cemented lens G89 arranged closest to the image is a cemented lens satisfying the conditional expressions (3) and (4) at the same time, the achromatism and Petzval sum can be prevented from increasing. For making the effects of this embodiment more reliable, it will be more preferred if the Abbe number ν8 of the positive lens G8 is greater than the Abbe number ν9 of the negative lens G9 by at least 20, i.e., the following conditional expression (a1) is satisfied:

$$v8 - v9 > 20 \quad (a1)$$

Preferably, the lens system ZL satisfies the following conditional expression (5):

$$0.3 < r8/f < 0.5 \quad (5)$$

where r8 denotes the radius of curvature of an image-side surface of the front-side negative lens component G4 (the eighth lens surface counted in order from the object in FIG. 1), and f denotes the focal length of the lens system ZL as a whole.

The conditional expression (5) is a condition for defining the ratio of the radius of curvature of the image-side surface of the front-side negative lens component G4 to the focal length f. When the ratio is less than the lower limit of the conditional expression (5), coma is harder to correct. Also, the rear group increases its power as a whole, so that spherical aberration may not be corrected favorably, which is unfavorable. When the ratio exceeds the upper limit of the conditional expression (5), on the other hand, the Petzval sum increases so much that curvature of field may be harder to correct, which is unfavorable.

In the lens system ZL, one or a plurality of lens components or a part thereof may be a focusing lens group which is moved along the optical axis so as to focus from an object at infinity to an object at a short distance. In this case, the focusing lens group is employable for autofocusing and suitable for being driven with a motor (such as ultrasonic motor) for autofocusing. In this embodiment, it will be preferred if the cemented lens G89 arranged closest to the image in the lens system ZL is moved at a speed different from that of another lens along an optical axis upon focusing. This can prevent spherical aberration and field tilts from occurring upon focusing to the object at a short distance. The aperture stop S moves along the optical axis together with the front-side negative lens component G4 or rear-side negative lens component G5 upon focusing.

Preferably, the cemented lens G89 arranged closest to the image satisfies the following conditional expression (6):

$$1 < f89/f < 2 \quad (6)$$

where f89 denotes the focal length of the cemented lens arranged closest to the image, and f denotes the focal length of the lens system as a whole.

The conditional expression (6) is a condition for defining the ratio of the focal length of the cemented lens arranged closest to the image to the focal length of the lens system ZL as a whole. When the ratio exceeds the upper limit of the conditional expression (6), the lens system as a whole becomes bulky. Also, upon focusing at a finite distance, the image surface may fluctuate greatly, thereby making it hard to correct aberrations from infinity to a short distance. It is also unfavorable in that the moving direction is so long that functions may deteriorate greatly. When the ratio is less than the lower limit of the conditional expression (6), on the other hand, it is unfavorable in that aberrations, such as chromatic aberration in particular, are harder to correct.

The lens system ZL in accordance with this embodiment has a focal length on the order of 60 to 150 mm, preferably on the order of 80 to 90 mm, in terms of 35-mm film format. More preferably, in the lens system ZL in accordance with this embodiment, the distance from the image-side surface of the positive lens G9 arranged closest to the image to the image surface (back focus) is on the order of 10 to 30 mm in the shortest state.

The following can appropriately be employed within the range where optical performances are not damaged.

First, the lens surfaces may be aspherical. The aspherical lens surfaces may be any of those made by grinding, glass-molded aspherical surfaces in which glass is formed aspherical with molds, and composite aspherical surfaces in which a resin is formed aspherical on a surface of glass. Preferably, at least one of the image-side surface of the front-side negative lens component G4 (negative meniscus lens L4 in FIG. 1), the object-side surface of the rear-side negative lens component G5 (double concave lens L5 in FIG. 1), and the image-side surface of the rear-side positive lens component G6 (double convex lens L6 in FIG. 1), or the object-side surface of the positive lens G8 (double convex lens L8 in FIG. 1) is an aspherical surface. The lens surfaces may also be diffractive surfaces. The lenses may be gradient-index lenses (GRIN lenses) or plastic lenses.

Though the aperture stop S is preferably arranged between the front-side negative lens component G4 (negative meniscus lens L4 in FIG. 1) and the rear-side negative lens component G5 (double concave lens L5 in FIG. 1), a lens frame may act therefor without providing any member as the aperture stop.

An antireflection coating exhibiting high transmittance over a broad wavelength range may be applied to each lens surface, so as to reduce flares and ghosts, whereby optical performances with a high contrast can be achieved.

Figure 9A:
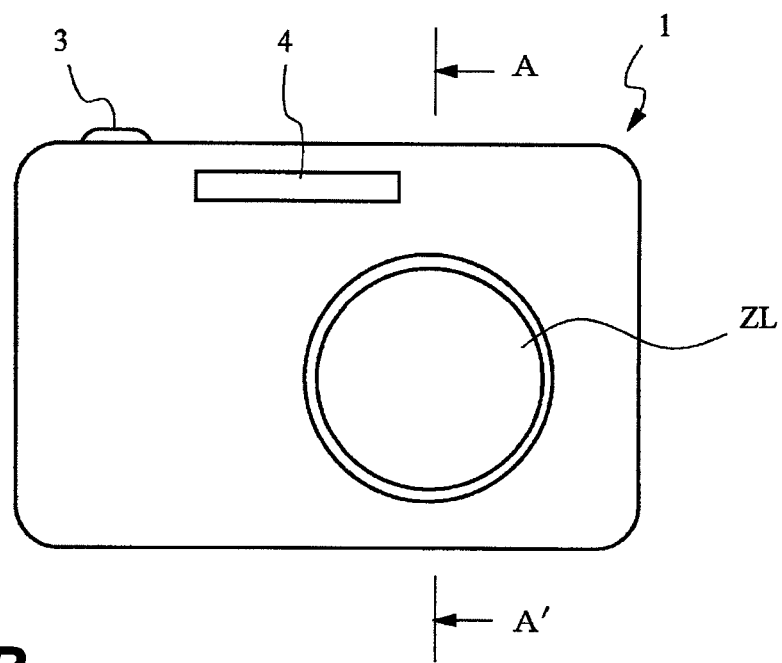
FIG. 9A is a front view of a digital still camera mounted with the lens system in accordance with the present invention.
Figure 9B:
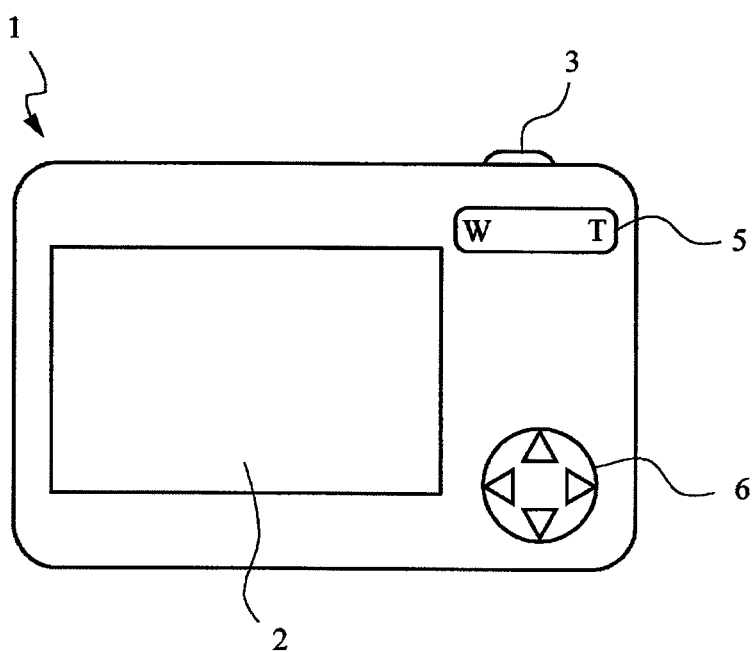
FIG. 9B is a rear view of the digital still camera mounted with the lens system in accordance with the present invention.
Figure 10:
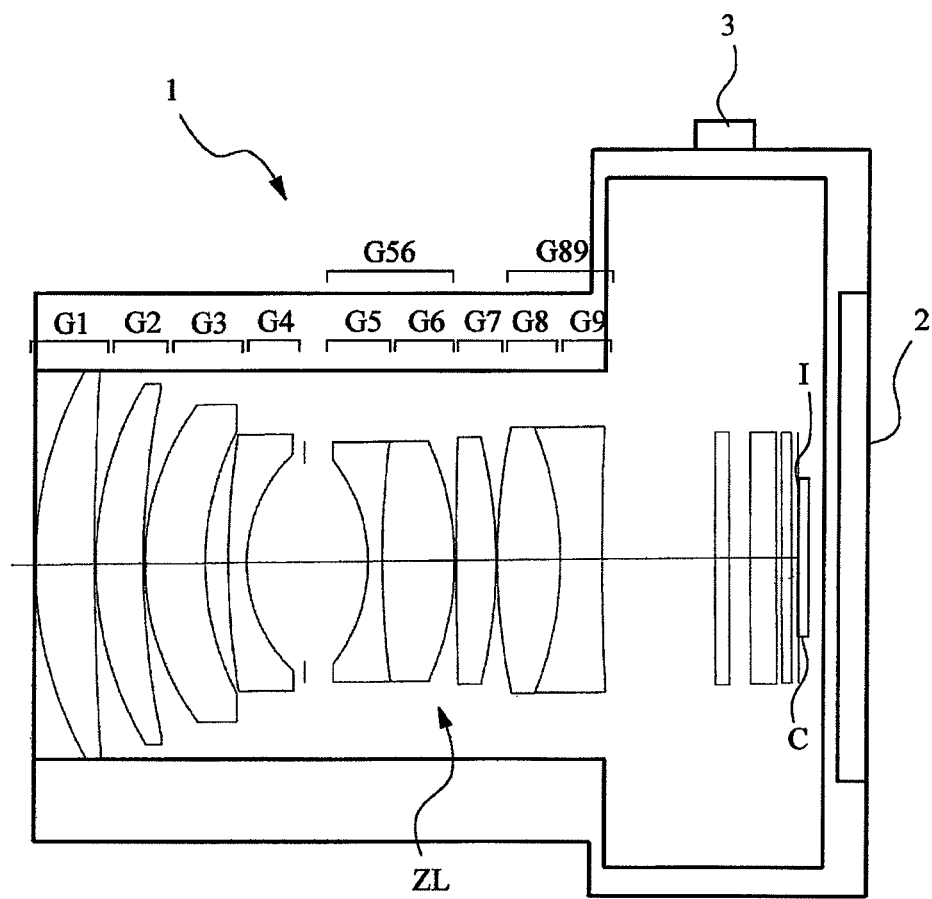
FIG. 10 is a sectional view taken along the line A-A' of FIG. 9A.

FIGS. 9 and 10 show the structure of a digital still camera 1 (hereinafter simply referred to as camera 1) as an optical device equipped with the above-mentioned lens system ZL. When an undepicted power button is pressed in this camera 1, an undepicted shutter of the lens system is released, so that light from an undepicted object is converged by the lens system ZL, so as to form an image on an imaging device C (e.g., film, CCD, or CMOS) arranged at an image surface I. The object image formed on the imaging device C is displayed on a liquid crystal monitor 2 arranged behind the camera 1. After deciding a composition of the object image while viewing the liquid crystal monitor 2, a photographer pushes down a release button 3, so as to capture the object image with the imaging device C and record it into an undepicted memory for storage.

Arranged in the camera 1 are an auxiliary light emitting part 4 for emitting auxiliary light when the object is dark, a wide (W)-telephoto (T) button 5 for zooming the variable power optical system ZL from the wide-angle end state (W) to the telephoto end state (T), a function button 6 used for setting various conditions and the like of the camera 1, and the like.

Second Embodiment

Figure 11:
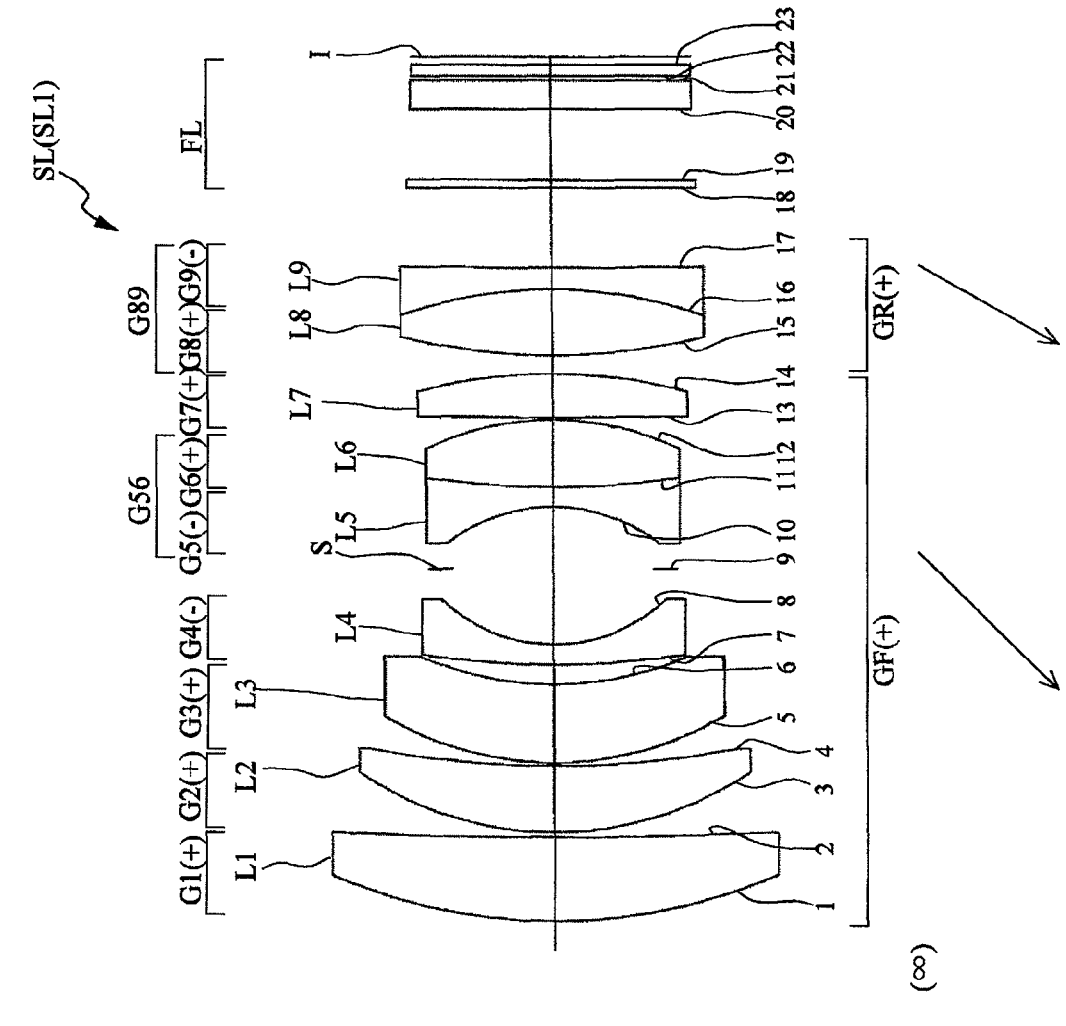
FIG. 11 is a sectional view showing the structure of the lens system in accordance with Example 5.

A preferred second embodiment of the present invention will now be explained with reference to the drawings. As shown in FIG. 11, this lens system comprises, in order from an object along an optical axis, a front-side lens group GF having a positive refractive power and a rear-side lens group GR having a positive refractive power. The front-side lens group GF includes, in order from the side closest to the object, a first lens component G1 having a positive refractive power and a second lens component G2 having a positive refractive power. The rear-side lens group GR has a cemented lens G89 constructed by cementing together a positive lens G8 and a negative lens G9 in order from the object. Such a structure allows the lens system SL to become a large-aperture lens having an effective diameter on the order of 25 to 30 mm. Since the cemented lens G89 constructed by cementing the positive lens G8 and negative lens G9 together is arranged as the lens closest to the image, the image-side lens also exhibits an achromatic effect, whereby the lens system SL as a whole can correct the chromatic aberration. This can reduce fluctuations in chromatic aberration upon focusing in particular. Such a cemented lens can prevent light beams from being totally reflected, so that the light beams can favorably pass through the lens.

As shown in FIG. 11, a specific preferred mode of the lens system SL comprises not only the above-mentioned first lens component G1, second lens component G2, and cemented lens G89, but also, in order from the object between the image side of the second lens component G2 and the object side of the cemented lens G89, a third lens component G3 having a meniscus form with a convex surface facing the object, a front-side negative lens component G4 as a fourth lens component having a negative refractive power, an aperture stop S, a cemented lens G56 constructed by cementing together a rear-side negative lens component G5 as a fifth lens component having a negative refractive power and a rear-side positive lens component G6 as a sixth lens component having a positive refractive power, and a seventh lens component G7 having a positive refractive power, so as to be composed of nine lenses in seven groups.

The lens system SL is a modification of a so-called Gaussian lens system. The Gaussian lens system has a form substantially symmetrical about a stop, thereby making it easy to correct distortion and the like. In the lens system SL, three lens components (first to third lens components G1 to G3 in FIG. 11) are arranged on the object side of the negative meniscus lens (front-side negative lens component G4 as a fourth lens component in FIG. 11) positioned closer to the object than is the aperture stop S, so as to increase their respective radii of curvature, thereby suppressing the occurrence of spherical aberration.

Preferably, each of the first lens component G1 and second lens component G2 in the lens system SL has a meniscus form with a convex surface facing the object. Preferably, the third lens component G3 has a meniscus form with a convex surface facing the object. Preferably, the fourth lens component G4 as the front-side negative lens component has a meniscus form with a convex surface facing the object. Preferably, the fifth lens component G5 and the sixth lens component G6 are cemented together so as to form a cemented lens. Preferably, the fifth lens component G5 as the rear-side negative lens component has a double concave surface. Preferably, the sixth lens component G6 has a double convex form. Preferably, the seventh lens component G7 is a positive lens having a double convex form or a positive meniscus lens having a convex surface facing the image. Preferably, the positive lens G8 in the cemented lens G89 arranged closest to the image has a double convex form.

When arranging the third lens component G3 having a positive or negative refractive power between the second lens component G2 and the fourth lens component G4 as mentioned above, the third lens component G3 is preferably composed of one or two lenses. When the seventh lens component G7 is arranged between the rear-side negative lens component G5 and the cemented lens G89, the seventh lens component G7 is preferably composed of one or two lenses and preferably has a positive refractive power.

Conditions for constructing such a lens system SL will now be explained with reference to two examples. To begin with, conditions concerning the first example will be explained. Preferably, upon focusing from infinity to an object at a short distance, the front-side lens group GF and the rear-side lens group GR move along the optical axis by respective amounts of movement different from each other so as to increase a distance between the front-side lens group GF and the rear-side lens group GR, while the lens system SL satisfies the following conditional expression (7):

$$0.79 < fF/fR < 1.58 \tag{7}$$

where fF denotes the focal length of the front-side lens group GF, and fR denotes the focal length of the rear-side lens group GR.

The conditional expression (7) is a conditional expression for defining an appropriate ratio between the respective focal lengths of the front-side lens group GF and rear-side lens group GR. When the ratio exceeds the upper limit of the conditional expression (7), the amount of spherical aberration and coma occurring in the rear-side lens group GR alone becomes greater. This unfavorably increases fluctuations in various aberrations at the time of focusing. For making the effects of the present invention reliable, the upper limit of the conditional expression (7) is preferably 1.52. For making the effects of the present invention more reliable, it will be more preferred if the upper limit of the conditional expression (7) is 1.46. For making the effects of the present invention further reliable, it will be further preferred if the upper limit of the conditional expression (7) is 1.40. When the ratio is less than the lower limit of the conditional expression (7), on the other hand, it is unfavorable in that the refractive power of the front-side lens group GF as a whole becomes stronger, so that the lens system as a whole may fail to favorably correct spherical aberration. For making the effects of the present invention reliable, the lower limit of the conditional expression (7) is preferably 0.85. For making the effects of the present invention more reliable, it will be more preferred if the lower limit of the conditional expression (7) is 0.90. For making the effects of the present invention further reliable, it will be further preferred if the lower limit of the conditional expression (7) is 0.95.

Preferably, in the lens system SL in accordance with the second embodiment, the front-side lens group GF and the rear-side lens group GR move by respective ratios of movement different from each other along the optical axis upon focusing from an intermediate shooting distance to the object at the short distance. Such a structure can favorably correct spherical aberration and curvature of field in the whole shooting distance region from infinity to the short distance. The aperture stop S moves along the optical axis together with the fourth lens component G4 or fifth lens component G5 upon focusing.

Preferably, the lens system SL satisfies the following conditional expression (8):

$$0.78 < (-f9)/f < 1.59 \tag{8}$$

where f9 denotes the focal length of the negative lens G9 in the rear-side lens group GR, and f denotes the focal length of the lens system SL as a whole.

The conditional expression (8) is a conditional expression for defining the ratio of the focal length f9 of the negative lens G9 in the rear-side lens group GR to the focal length f of the lens system SL as a whole. When the ratio exceeds the upper limit of the conditional expression (8), the chromatic aberration of magnification occurring in the rear-side lens group GR alone becomes greater. This increases fluctuations in chromatic aberration of magnification at the time of focusing, which is unfavorable. For making the effects of the present invention reliable, the upper limit of the conditional expression (8) is preferably 1.53. For making the effects of the present invention more reliable, it will be more preferred if the upper limit of the conditional expression (8) is 1.47. For making the effects of the present invention further reliable, it will be further preferred if the upper limit of the conditional expression (8) is 1.41. When the ratio is less than the lower limit of the conditional expression (8), on the other hand, it is unfavorable in that the chromatic aberration of magnification occurring in the rear-side lens group GR alone deteriorates. For making the effects of the present invention reliable, the lower limit of the conditional expression (8) is preferably 0.85. For making the effects of the present invention more reliable, it will be more preferred if the lower limit of the conditional expression (8) is 0.90. For making the effects of the present invention further reliable, it will be further preferred if the lower limit of the conditional expression (8) is 0.94.

Preferably, the lens system SL satisfies the following conditional expression (9):

$$0.30 < r8/f < 0.50 \tag{9}$$

where r8 denotes the radius of curvature of the image-side surface of the fourth lens component G4 (the eighth lens surface counted in order from the object in FIG. 11), and f denotes the focal length of the lens system SL as a whole.

The conditional expression (9) is a conditional expression for defining the ratio of the radius of curvature r8 of the image-side surface of the fourth lens component G4 to the focal length f. When the ratio exceeds the upper limit of the conditional expression, the Petzval sum increases so much that curvature of field may be harder to correct, which is unfavorable. For making the effects of the present invention reliable, the upper limit of the conditional expression (9) is preferably 0.45. For making the effects of the present invention more reliable, it will be more preferred if the upper limit of the conditional expression (9) is 0.40. For making the effects of the present invention further reliable, it will be further preferred if the upper limit of the conditional expression (9) is 0.35. When the ratio is less than the lower limit of the conditional expression (9), on the other hand, coma is harder to correct. Also, the rear-side lens group GR increases its power as a whole, so that spherical aberration may not be corrected favorably in the lens system as a whole, which is unfavorable. For making the effects of the present invention reliable, the lower limit of the conditional expression (9) is preferably 0.31. For making the effects of the present invention more reliable, it will be more preferred if the lower limit of the conditional expression (9) is 0.32.

Preferably, the lens system SL satisfies the following conditional expressions (10) and (11):

$$n8 > n9 \tag{10}$$

$$v8 > v9 \tag{11}$$

where n9 and v9 denote the refractive index and Abbe number of the negative lens G9 arranged closest to the image in the cemented lens G89 included in the rear-side lens group GR at d-line, respectively, and n8 and v8 denote the refractive index and Abbe number of the positive lens G8 cemented to the object side of the negative lens G9 at d-line, respectively.

The conditional expressions (10) and (11) are conditional expressions for defining the refractive powers and Abbe numbers of the positive lens G8 and negative lens G9 in the cemented lens G89 arranged closest to the image. Satisfying the conditional expression (10) can prevent the Petzval sum from increasing. Satisfying the conditional expression (11) can favorably correct chromatic aberration. If a material having a high refractive index is used for the positive lens G8 in order to suppress the occurrence of coma and spherical aberration, the Abbe number will decrease, whereby the negative lens G9 will tend to have a high refractive index for correcting chromatic aberration. This may increase the Petzval sum. When the cemented lens G89 arranged closest to the image is a cemented lens satisfying the conditional expressions (10) and (11) at the same time, by contrast, chromatic aberration correction and the Petzval sum can be prevented from becoming greater even if a material having a high refractive index is used. For making the effects of the second embodiment more reliable, it will be more preferred if the Abbe number v8 of the positive lens G8 is greater than the Abbe number v9 of the negative lens G9 by at least 20, i.e., the following conditional expression (a2) is satisfied:

$$v8 - v9 > 20 \tag{a2}$$

Preferably, the lens system SL satisfies the following conditional expression (12):

$$1.00 < fR/f < 2.00 \tag{12}$$

where fR denotes the focal length of the rear-side lens group GR, and f denotes the focal length of the lens system SL as a whole.

The conditional expression (12) is a conditional expression for defining the ratio of the focal length fR of the rear-side lens group GR to the focal length of the lens system SL as a whole. When the ratio exceeds the upper limit of the conditional expression (12), the lens system SL as a whole becomes bulky. Upon focusing at a finite distance, the image surface may fluctuate greatly, thereby making it hard to correct aberrations from infinity to a short distance, which is also unfavorable. For making the effects of the present invention reliable, the upper limit of the conditional expression (12) is preferably 1.90. For making the effects of the present invention more reliable, it will be more preferred if the upper limit of the conditional expression (12) is 1.80. For making the effects of the present invention further reliable, it will be further preferred if the upper limit of the conditional expression (12) is 1.60. When the ratio is less than the lower limit of the conditional expression (12), on the other hand, it is unfavorable in that spherical aberration is harder to correct. For making the effects of the present invention reliable, the lower limit of the conditional expression (12) is preferably 1.10. For making the effects of the present invention more reliable, it will be more preferred if the lower limit of the conditional expression (12) is 1.20.

Conditions concerning the second example will now be explained. Upon focusing from infinity to an object at a short distance, the front-side lens group GF and the rear-side lens group GR move toward the object along the optical axis by respective amounts of movement different from each other so as to increase a distance between the front-side lens group GF and the rear-side lens group GR, while the lens system SL preferably satisfies the following conditional expressions (13) and (14):

$$(\nu 1+\nu 2)/2>60 \qquad (13)$$

$$0.35<\gamma R1/\gamma F1<0.80 \qquad (14)$$

where ν1 denotes the Abbe number of the first lens component G1 at d-line, ν2 denotes the Abbe number of the second lens component G2 at d-line, γF1 denotes the amount of movement of the front-side lens group GF upon focusing from infinity to a magnification of −0.01, and γR1 denotes the amount of movement of the rear-side lens group GR upon focusing from infinity to the magnification of −0.01. When the first lens component G1 or the second lens component G2 is constituted by a cemented lens, its Abbe number is an average value of Abbe numbers of the lenses constituting the cemented lens.

The conditional expression (13) is a conditional expression for defining a combination of optical material characteristics of the first lens component G1 having a positive refractive power and the second lens component G2 having a positive refractive power in the front-side lens group GF. When the ratio is less than the lower limit of the conditional expression (13), chromatic aberration of magnification is corrected insufficiently in the modified Gaussian lens system SL in which the lens component closest to the object is greatly influential in the occurrence of chromatic aberration, whereby favorable performances are harder to keep, which is unfavorable. For making the effects of the present invention reliable, the lower limit of the conditional expression (13) is preferably 61. For making the effects of the present invention more reliable, it will be more preferred if the lower limit of the conditional expression (13) is 63. For making the effects of the present invention further reliable, it will be further preferred if the lower limit of the conditional expression (13) is 65.

The conditional expression (14) is a conditional expression for defining an appropriate range of the moving ratio of the front-side lens group GF and rear-side lens group GR upon focusing at an intermediate shooting distance. When the ratio exceeds the upper limit of the conditional expression (14), coma and curvature of field are corrected in excess, which is unfavorable. For making the effects of the present invention reliable, the upper limit of the conditional expression (14) is preferably 0.77. For making the effects of the present invention more reliable, it will be more preferred if the upper limit of the conditional expression (14) is 0.74. For making the effects of the present invention further reliable, it will be further preferred if the upper limit of the conditional expression (14) is 0.71. When the ratio is less than the lower limit of the conditional expression (14), on the other hand, it is unfavorable in that coma and curvature of field are harder to correct. For making the effects of the present invention reliable, the lower limit of the conditional expression (14) is preferably 0.39. For making the effects of the present invention more reliable, it will be more preferred if the lower limit of the conditional expression (14) is 0.43. For making the effects of the present invention further reliable, it will be further preferred if the lower limit of the conditional expression (14) is 0.47.

Preferably, assuming that n1 denotes the refractive index of the first lens component G1 at d-line and n2 denotes the refractive index of the second lens component G2 at d-line, the lens system SL satisfies the following conditional expression (15). When the first lens component G1 or the second lens component G2 is constituted by a cemented lens, its Abbe number is an average value of Abbe numbers of the lenses constituting the cemented lens.

$$(n1+n2)/2>1.49 \qquad (15)$$

The conditional expression (15) is a conditional expression for defining the refractive index of two meniscus lens components G1, G2 on the object side. Satisfying the conditional expression (15) can favorably correct coma and chromatic aberration of magnification. For making the effects of the present invention reliable, the lower limit of the conditional expression (15) is preferably 1.52. For making the effects of the present invention more reliable, it will be more preferred if the lower limit of the conditional expression (15) is 1.55. For making the effects of the present invention further reliable, it will be further preferred if the lower limit of the conditional expression (15) is 1.59.

Preferably, in the lens system SL in accordance with this embodiment, the front-side lens group GF and rear-side lens group GR move by respective ratios of movement different from each other along the optical axis upon focusing from an intermediate shooting distance to the object at the short distance. Such a structure can favorably correct spherical aberration and curvature of field in the whole shooting distance region from infinity to the short distance. The aperture stop S moves along the optical axis together with the fourth lens component G4 or fifth lens component G5 upon focusing.

Preferably, the lens system SL satisfies the following conditional expression (16):

$$0.35<\gamma R2/\gamma F2<0.50 \qquad (16)$$

where γF2 and γR2 denote the respective amounts of movement of the front- and rear-side lens groups GF, GR upon focusing from infinity to a magnification of −0.07.

The conditional expression (16) is a conditional expression for defining an appropriate range of the moving ratio of the front-side lens group GF and rear-side lens group GR upon focusing at a short shooting distance. When the ratio exceeds the upper limit of the conditional expression (16), coma and curvature of field are corrected in excess, which is unfavorable. For making the effects of the present invention reliable, the upper limit of the conditional expression (16) is preferably 0.48. For making the effects of the present invention more reliable, it will be more preferred if the upper limit of the conditional expression (14) is 0.46. When the ratio is less than the lower limit of the conditional expression (16), on the other hand, it is unfavorable in that coma and curvature of field are harder to correct. For making the effects of the present invention reliable, the lower limit of the conditional expression (16) is preferably 0.36. For making the effects of the present invention more reliable, it will be more preferred if the lower limit of the conditional expression (16) is 0.37.

Preferably, assuming that n9 and ν9 denote the refractive index and Abbe number of the negative lens G9 arranged closest to the image in the cemented lens G89 at d-line, respectively, and n8 and ν8 denote the refractive index and Abbe number of the positive lens G8 cemented to the object side of the negative lens G9 at d-line, respectively, the lens system SL satisfies the following conditional expressions (17) and (18):

$$n8 > n9 \quad (17)$$

$$v8 > v9 \quad (18)$$

The conditional expressions (17) and (18) are conditional expressions for defining the refractive powers and Abbe numbers of the positive lens G8 and negative lens G9 in the cemented lens G89 arranged closest to the image. Satisfying the conditional expression (17) can prevent the Petzval sum from increasing. Satisfying the conditional expression (18) can favorably correct chromatic aberration. If a material having a high refractive index is used for the positive lens G8 in order to suppress the occurrence of coma and spherical aberration, the Abbe number will decrease, whereby the negative lens G9 will tend to have a high refractive index for correcting chromatic aberration. This may increase the Petzval sum. When the cemented lens G89 arranged closest to the image is a cemented lens satisfying the conditional expressions (17) and (18) at the same time, by contrast, chromatic aberration correction and the Petzval sum can be prevented from increasing even if a material having a high refractive index is used. For making the effects of the second embodiment more reliable, it will be more preferred if the Abbe number v8 of the positive lens G8 is greater than the Abbe number v9 of the negative lens G9 by at least 20, i.e., the following conditional expression (a3) is satisfied:

$$v8 - v9 > 20 \quad (a3)$$

Preferably, the lens system SL satisfies the following conditional expression:

$$0.30 < r8/f < 0.50 \quad (19)$$

where r8 denotes the radius of curvature of the image-side surface of the fourth lens component G4 (the eighth lens surface counted in order from the object in FIG. 1), and f denotes the focal length of the lens system SL as a whole.

The conditional expression (19) is a conditional expression for defining the ratio of the radius of curvature of the image-side surface of the fourth lens component G4 to the focal length f. When the ratio exceeds the upper limit of the conditional expression, the Petzval sum increases so much that curvature of field may be harder to correct, which is unfavorable. For making the effects of the present invention reliable, the upper limit of the conditional expression (19) is preferably 0.45. For making the effects of the present invention more reliable, it will be more preferred if the upper limit of the conditional expression (19) is 0.40. For making the effects of the present invention further reliable, it will be further preferred if the upper limit of the conditional expression (19) is 0.35. When the ratio is less than the lower limit of the conditional expression (19), on the other hand, coma is harder to correct. Also, the rear-side lens group GR increases its power as a whole, so that spherical aberration may not be corrected favorably, which is unfavorable. For making the effects of the present invention reliable, the lower limit of the conditional expression (19) is preferably 0.31. For making the effects of the present invention more reliable, it will be more preferred if the lower limit of the conditional expression (19) is 0.32.

Preferably, the lens system SL satisfies the following conditional expression (20):

$$1.00 < fR/f < 2.00 \quad (20)$$

where fR denotes the focal length of the rear-side lens group GR, and f denotes the focal length of the lens system SL as a whole.

The conditional expression (20) is a conditional expression for defining the ratio of the focal length fR of the rear-side lens group GR to the focal length of the lens system SL as a whole. When the ratio exceeds the upper limit of the conditional expression (20), the lens system SL as a whole becomes bulky. Upon focusing at a finite distance, the image surface may fluctuate greatly, thereby making it hard to correct aberrations from infinity to a short distance, which is also unfavorable. For making the effects of the present invention reliable, the upper limit of the conditional expression (20) is preferably 1.90. For making the effects of the present invention more reliable, it will be more preferred if the upper limit of the conditional expression (20) is 1.80. For making the effects of the present invention further reliable, it will be further preferred if the upper limit of the conditional expression (20) is 1.60. When the ratio is less than the lower limit of the conditional expression (20), on the other hand, it is unfavorable in that spherical aberration is harder to correct. For making the effects of the present invention reliable, the lower limit of the conditional expression (20) is preferably 1.10. For making the effects of the present invention more reliable, it will be more preferred if the lower limit of the conditional expression (20) is 1.20.

In order to prevent shooting from failing because of image blurs caused by camera shakes and the like, the lens system SL can combine a shake detection system for detecting shakes of the lens system and driving means with the lens system and drive the whole or part of one of the lens groups constituting the lens system as a shift lens group with the driving means such that the shift lens group is decentered so as to correct image blurs (fluctuations in the image surface position) due to shakes of the lens system detected by the shake detection system, thus shifting the image, thereby correcting the image blurs. Thus, the lens system SL in accordance with the second embodiment can function as a so-called vibration reduction optical system.

Though the lens system is constructed by two movable groups in this embodiment, additional lens groups may be inserted between the existing lens groups or arranged adjacent thereto on the image side or object side of the lens system.

The lens system SL in accordance with the second embodiment has a focal length on the order of 60 to 150 mm, preferably on the order of 80 to 90 mm, in terms of 35-mm film format. More preferably, in the lens system SL in accordance with the second embodiment, the distance from the image-side surface of the positive lens G9 arranged closest to the image to the image surface (back focus) is on the order of 10 to 30 mm in the shortest state.

The following can appropriately be employed within the range where optical performances are not damaged.

First, the lens surfaces may be aspherical. The aspherical lens surfaces may be any of those made by grinding, glass-molded aspherical surfaces in which glass is formed aspherical with molds, and composite aspherical surfaces in which a resin is formed aspherical on a surface of glass. Preferably, at least one of the image-side surface of the fourth lens component G4 as the front-side negative lens component (negative meniscus lens L4 in FIG. 11), the object-side surface of the fifth lens component G5 as the rear-side negative lens component (double concave lens L5 in FIG. 11), and the image-side surface of the sixth lens component G6 as the rear-side positive lens component (double convex lens L6 in FIG. 11), or the object-side surface of the positive lens G8 (double convex lens L8 in FIG. 11) is an aspherical surface. The lens surfaces may also be diffractive surfaces. The lenses may be gradient-index lenses (GRIN lenses) or plastic lenses.

Though the aperture stop S is preferably arranged between the fourth lens component G4 as the front-side negative lens component (negative meniscus lens L4 in FIG. 11) and the fifth lens component G5 as the rear-side negative lens component (double concave lens L5 in FIG. 11), a lens frame may act therefor without providing any member as the aperture stop.

An antireflection coating exhibiting high transmittance over a broad wavelength range may be applied to each lens surface, so as to reduce flares and ghosts, whereby optical performances with a high contrast can be achieved.

Figure 19:
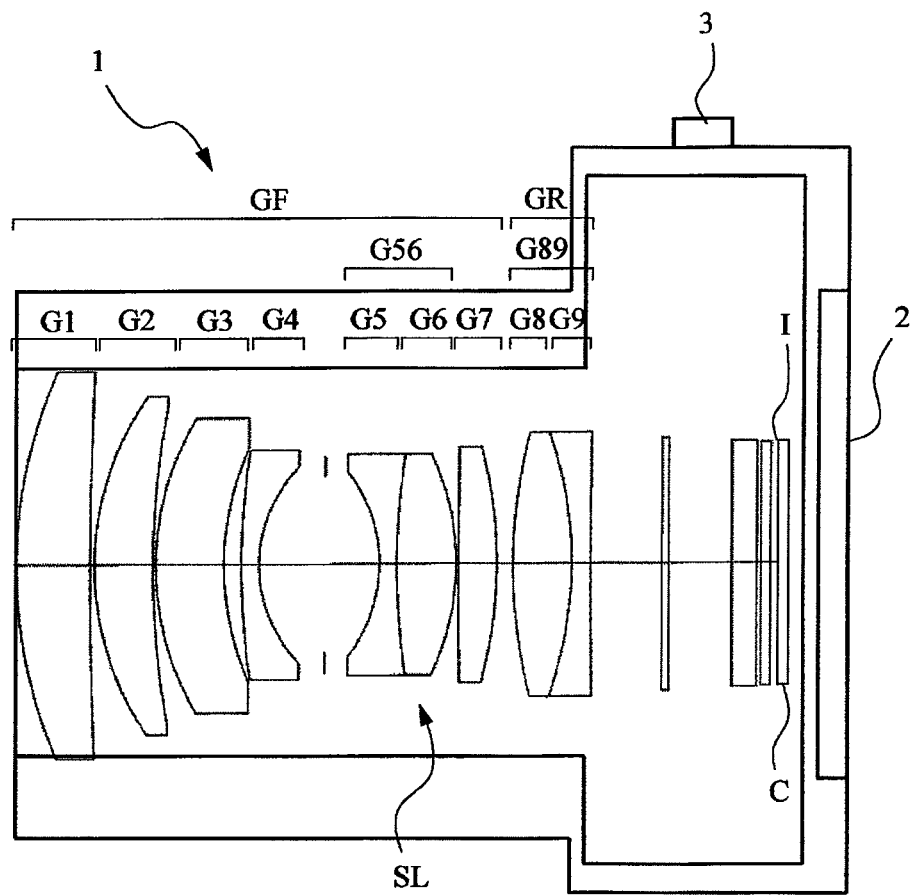
FIG. 19 is a view for explaining a cross-sectional structure of a digital still camera mounted with the lens system in accordance with the present invention.

FIG. 19 shows the structure of a digital still camera 101 as an optical device equipped with the above-mentioned lens system SL. When an undepicted power button is pressed in this digital still camera 101, an undepicted shutter of the lens system SL is released, so that light from an undepicted object is converged by the lens system SL, so as to form an image on an imaging device C (e.g., film, CCD, or CMOS) arranged at an image surface I. The object image formed on the imaging device C is displayed on a liquid crystal monitor 2 arranged behind the digital still camera 101. After deciding a composition of the object image while viewing the liquid crystal monitor 2, a photographer pushes down a release button 3, so as to capture the object image with the imaging device C and record it into an undepicted memory for storage. The lens system SL is also employable as an interchangeable lens system detachably mountable to a camera body.

Figure 20:
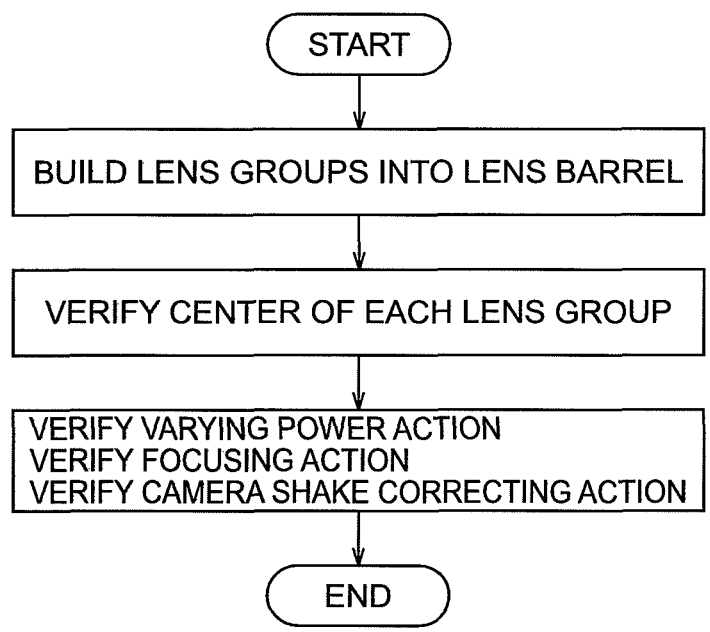
FIG. 20 is a flowchart showing a method of manufacturing the zoom optical system in accordance with the present invention.

An outline of a method of manufacturing the lens system will now be explained with reference to FIG. 20.

To begin with, each lens is built into a cylindrical lens barrel. The lenses may be built into the lens barrel one by one in their order along the optical axis, or a part or all of the lenses may be integrally held with a holding member and then assembled with a lens barrel member. Here, in the lens system of this embodiment, the first lens component L1 having a positive refractive power, the second lens component L2 having a positive refractive power, the third lens component L3 having a positive refractive power, the fourth lens component L4 having a negative refractive power, the fifth lens component L5 having a negative refractive power, the sixth lens component L6 having a positive refractive power, the seventh lens component L7 having a positive refractive power, the cemented lens constructed by cementing together the positive lens L8 and the negative lens L9 are arranged in order from the object. Preferably, after the lenses are built into the lens barrel, whether or not an image of an object is formed in the state where the lenses are built into the lens barrel is determined.

After the lens system is assembled as mentioned above, its various actions are verified. Examples of the actions include a varying a focusing action in which a lens group for focusing from an object at infinity to an object at a short distance moves along the optical axis, and a camera shake correcting action in which at least a part of lenses moves so as to have a component orthogonal to the optical axis. The various actions can be verified in any order.

The present invention is explained with reference to constituent features of its embodiments for easier understanding, but is not limited thereto as a matter of course.

EXAMPLES

Examples 1 to 4 in accordance with the first embodiment of the present invention will now be explained with reference to the drawings. FIGS. 1, 3, 5, and 7 are sectional views showing structures of lens systems ZL (ZL1 to ZL4) in accordance with Examples 1 to 4, respectively, while arrows therein indicate directions by which lens groups are moved along the optical axis when focusing the lens systems ZL1 to ZL4 from infinity to an object at a short distance. As shown in FIGS. 1, 3, 5, and 7 and described above, each of the lens systems ZL1 to ZL4 is composed, in order from the object, of the first lens component G1 having a positive refractive power, the second lens component G2 having a positive refractive power, the third lens component G3 having a meniscus form with a convex surface facing the object, the front-side negative lens component (fourth lens component) G4 having a negative refractive power, the aperture stop S, the cemented lens G56 constructed by cementing together the rear-side negative lens component (fifth lens component) G5 having a negative refractive power and the rear-side positive lens component (sixth lens component) G6 having a positive refractive power, the seventh lens component G7 having a positive refractive power, the cemented lens G89 constructed by cementing a positive lens G8 and a negative lens G9 together, and a filter group FL. The filter group FL is constituted by a low-pass filter, an infrared cut filter, and the like. As shown in FIG. 10, the image surface I forms an image on the imaging device C (e.g., film, CCD, or CMOS).

Example 1

FIG. 1 is a view showing the structure of the lens system ZL1 in accordance with Example 1 of the present invention. Example 1 is an example of the first embodiment. In the lens system ZL1 of FIG. 1, the first lens component G1 is constituted by a positive meniscus lens L1 having a convex surface facing the object, the second lens component G2 is constituted by a positive meniscus lens L2 having a convex surface facing the object, the third lens component G3 is constituted by a positive meniscus lens L3 having a convex surface facing the object, the front-side negative lens component (fourth lens component) G4 is constituted by a negative meniscus lens L4 having a convex surface facing the object, the cemented lens G56 is constructed by cementing together the rear-side negative lens component G5 (fifth lens component) composed of a double concave lens L5 and the rear-side positive lens component G6 (sixth lens component) composed of a double convex lens L6, the seventh lens component G7 is constituted by a double convex positive lens L7, and the cemented lens G89 is constructed by cementing together an eighth lens G8 composed of a double convex lens L8 and a ninth lens G9 composed of a double concave lens L9.

Focusing from a long distance to a short distance is carried out by dividing the whole lens system ZL into two groups, i.e., a set of the lens components G1 to G7 and the cemented lens G89, and extending them separately toward the object. Upon focusing, the aperture stop S moves along the optical axis together with the front-side negative lens component G4 and the rear-side negative lens component G5. At the time of focusing, the front-side lens group (G1 to G7) moves faster than the rear-side lens group (cemented lens G89).

The following Table 1 lists values of data in Example 1. In Table 1, f, F.NO, and 2ω denote the focal length, f-number, and angle of view, respectively. The surface number indicates the lens surface number counted in order from the object along the advancing direction of light beams, the surface distance indicates the distance on the optical axis from each optical surface to the next optical surface, and the refractive index and Abbe number refer to their values at d-line (µ=587.6 nm). The total lens length indicates the length on the optical axis from the first lens surface to the image surface when focused at infinity. While "mm" is generally used for the unit of lengths such as focal length f, radius of curvature r, and surface distance d listed in all of the following data values, the unit is not limited thereto, since optical systems can attain similar optical performances even after being proportionally enlarged or reduced. The radius of curvature of 0.0000 indicates a plane, while the refractive index of air, which is 1.00000, is omitted. These explanations of symbols and data tables also apply to examples which will follow. In the following tables, IH, TLL, IF, ID, and SD denote Image height, Total lens length, Infinity, Intermediate distance, and Short distance, respectively. Also, s, r, d, n, and ν denote the Surface No., Radius of curvature, Surface distance, Refractive index, and Abbe number, respectively, in the following tables.

TABLE 1 f = 32.0
F. NO = 1.2
2ω = 29.9
IH = 8.5
TLL = 54.6

| s | r | d | n | ν |
|---|---|---|---|---|
| 1 | 28.9228 | 4.30 | 1.5924 | 68.36 |
| 2 | 228.3618 | 0.10 | | |
| 3 | 26.0101 | 3.39 | 1.5924 | 68.36 |
| 4 | 63.1641 | 0.10 | | |
| 5 | 19.3125 | 4.33 | 1.8160 | 46.62 |
| 6 | 20.7366 | 1.70 | | |
| 7 | 60.3267 | 1.30 | 1.6727 | 32.10 |
| 8 | 10.9478 | 4.14 | | |
| 9 | 0.0000 | 4.55 | | (aperture stop) |
| 10 | −12.1627 | 1.00 | 1.6727 | 32.10 |
| 11 | 69.4239 | 5.19 | 1.8830 | 40.76 |
| 12 | −20.9084 | 0.10 | | |
| 13 | 270.4986 | 2.85 | 1.7550 | 52.32 |
| 14 | −37.4965 | (d1) | | |
| 15 | 46.6626 | 4.50 | 1.8830 | 40.76 |
| 16 | −25.9360 | 2.99 | 1.7618 | 26.52 |
| 17 | 258.6980 | (d2) | | |
| 18 | 0.0000 | 1.00 | 1.5168 | 64.10 |
| 19 | 0.0000 | 1.50 | | |
| 20 | 0.0000 | 1.87 | 1.5168 | 64.10 |
| 21 | 0.0000 | 0.40 | | |
| 22 | 0.0000 | 0.70 | 1.5168 | 64.10 |
| 23 | 0.0000 | 0.50 | | |

In Example 1, the axial air space d1 between the seventh lens component G7 and eighth lens G8 (cemented lens G89) and the axial air space d2 between the ninth lens component G9 and filter group FL vary upon focusing. The following Table 2 lists values of variable spaces at infinity and at a magnification of 1/13.6.

TABLE 2

| | Infinity | Magnification 1/13.6 |
|---|---|---|
| d1 | 0.10 | 2.05 |
| d2 | 7.98 | 9.55 |

The following Table 3 lists values corresponding to the conditional expressions in Example 1. In Table 3, n1, ν1, n2, ν2, n8, ν8, n9, ν9, r8, and f denote the refractive index of the first lens component G1 at d-line, the Abbe number of the first lens component G1, the refractive index of the second lens component G2 at d-line, the Abbe number of the second lens component G2, the refractive index of the positive lens G8 at d-line, the Abbe number of the positive lens G8, the refractive index of the negative lens G9 at d-line, the Abbe number of the negative lens G9, the radius of curvature of the eighth surface on the image side of the front-side negative lens component G4, and the focal length of the lens system ZL as a whole, respectively. These explanations of symbols also apply to examples which will follow.

TABLE 3

(1) (n1 + n2)/2 = 1.5920
(2) (ν1 + ν2)/2 = 68.36
(3) n8 = 1.8830
    n9 = 1.7618
(4) ν8 = 40.76
    ν9 = 26.52
(5) r8/f = 0.34
(6) f89/f = 1.51

Figure 2A:
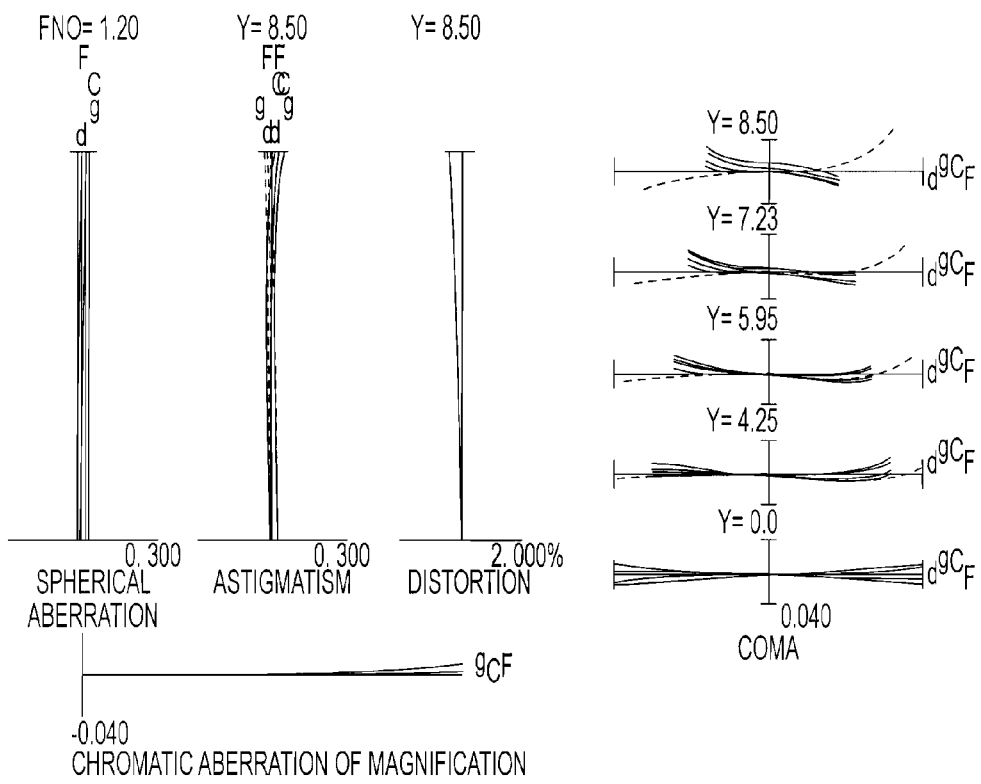
FIG. 2A is an aberration chart in Example 1 showing various aberrations in a state focused at infinity.
Figure 2B:
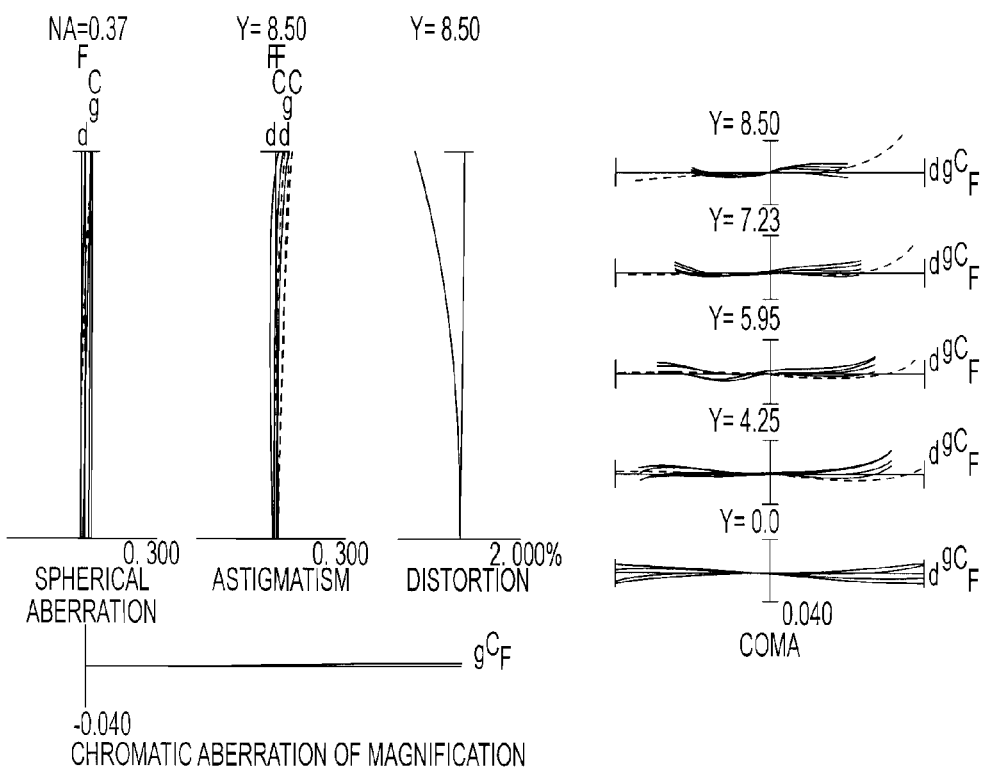
FIG. 2B is an aberration chart in Example 1 showing various aberrations in a state focused at a finite distance.

FIG. 2 shows various aberration charts of Example 1. FIG. 2A is an aberration chart showing various aberrations in a state focused at infinity, while FIG. 2B is an aberration chart showing various aberrations in a state focused at a finite distance. In each aberration chart, NA, Y, d, g, C, and F indicate the numerical aperture, image height, d-line ($\lambda$=587.6 nm), g-line ($\lambda$=435.6 nm), C-line ($\lambda$=656.3 nm), and F-line ($\lambda$=486.1 nm), respectively. In each astigmatism chart, solid and broken lines indicate sagittal and meridional image surfaces, respectively. In each spherical aberration chart, solid and broken lines indicate spherical aberration and sine condition, respectively. These explanations of the aberration charts also apply to the following examples. As can be seen from the aberration charts, various aberrations are favorably corrected in each focus state, whereby Example 1 has excellent image-forming performances.

Example 2

Figure 3:
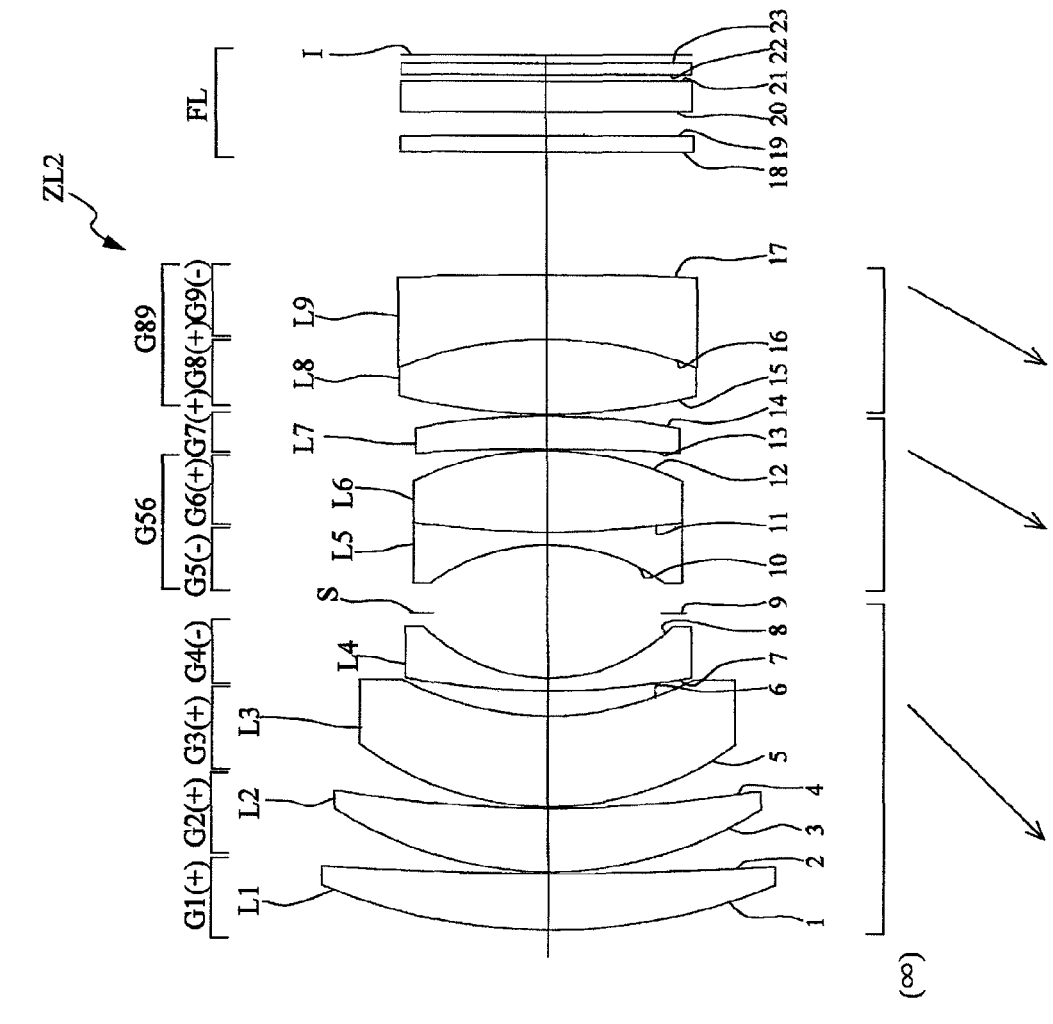
FIG. 3 is a sectional view showing the structure of the lens system in accordance with Example 2.

FIG. 3 is a view showing the structure of the lens system ZL2 in accordance with Example 2 of the present invention. Example 2 is an example of the first embodiment. In the lens system ZL2 of FIG. 3, the first lens component G1 is constituted by a positive meniscus lens L1 having a convex surface facing the object, the second lens component G2 is constituted by a positive meniscus lens L2 having a convex surface facing the object, the third lens component G3 is constituted by a positive meniscus lens L3 having a convex surface facing the object, the front-side negative lens component (fourth lens component) G4 is constituted by a negative meniscus lens L4 having a convex surface facing the object, the cemented lens G56 is constructed by cementing together the rear-side negative lens component G5 (fifth lens component) composed of a double concave lens L5 and the rear-side positive lens component G6 (sixth lens component) composed of a double convex lens L6, the seventh lens component G7 is constituted by a positive meniscus lens L7 having a convex surface facing the image, and the cemented lens G89 is constructed by cementing together an eighth lens G8 composed of a double convex lens L8 and a ninth lens G9 composed of a negative meniscus lens L9 having a convex surface facing the image.

Focusing from a long distance to a short distance is carried out by dividing the whole lens system ZL into three groups, i.e., a set of the lens components G1 to G4, a set of the lens components G5 to G7, and the cemented lens G89, and extending them separately toward the object. Upon focusing, the aperture stop S moves along the optical axis together with the front-side negative lens component G4. At the time of focusing, the set of lens components G1 to G4, the set of lens components G5 to G7, and the cemented lens G89 move faster in this order.

The following Table 4 lists values of data in Example 2.

TABLE 4 f = 32.0
F. NO = 1.2
2ω = 29.9
IH = 8.5
TLL = 54.4

| s | r | d | n | ν |
|---|---|---|---|---|
| 1 | 37.0000 | 3.53 | 1.5924 | 68.36 |
| 2 | 234.8452 | 0.10 | | |
| 3 | 24.4487 | 3.93 | 1.5924 | 68.36 |
| 4 | 79.8238 | 0.10 | | |
| 5 | 19.5757 | 5.63 | 1.8160 | 46.62 |
| 6 | 19.2626 | 1.57 | | |
| 7 | 48.1037 | 0.80 | 1.6727 | 32.10 |
| 8 | 10.9088 | 4.05 | | |
| 9 | 0.0000 | (d1) | | (aperture stop) |
| 10 | −12.2741 | 0.80 | 1.6989 | 30.13 |
| 11 | 59.2157 | 5.08 | 1.8830 | 40.76 |
| 12 | −19.1818 | 0.10 | | |
| 13 | −122.2510 | 2.09 | 1.7550 | 52.32 |
| 14 | −42.5780 | (d2) | | |
| 15 | 38.5205 | 4.67 | 1.8830 | 40.76 |
| 16 | −25.0706 | 4.03 | 1.7618 | 26.52 |
| 17 | −223.2770 | (d3) | | |
| 18 | 0.0000 | 1.00 | 1.5168 | 64.10 |
| 19 | 0.0000 | 1.50 | | |
| 20 | 0.0000 | 1.87 | 1.5168 | 64.10 |
| 21 | 0.0000 | 0.40 | | |
| 22 | 0.0000 | 0.70 | 1.5168 | 64.10 |
| 23 | 0.0000 | 0.50 | | |

In Example 2, the axial air space d1 between the front-side negative lens component G4 and rear-side negative lens component G5, the axial air space d2 between the seventh lens component G7 and eighth lens component G8, and the axial air space d3 between the ninth lens component G9 and filter group FL vary upon focusing. The following Table 5 lists values of variable spaces at infinity and at a magnification of 1/13.6.

TABLE 5

| | Infinity | Magnification 1/13.6 |
|---|---|---|
| d1 | 4.23 | 4.62 |
| d2 | 0.1 | 1.9 |
| d3 | 7.59 | 9.52 |

The following Table 6 lists values corresponding to the conditional expressions in Example 2.

TABLE 6

(1) $(n1 + n2)/2 = 1.5920$
(2) $(\nu 1 + \nu 2)/2 = 68.36$
(3) $n8 = 1.8830$
   $n9 = 1.7618$
(4) $\nu 8 = 40.76$
   $\nu 9 = 26.52$
(5) $r8/f = 0.34$
(6) $f89/f = 1.03$

Figure 4A:
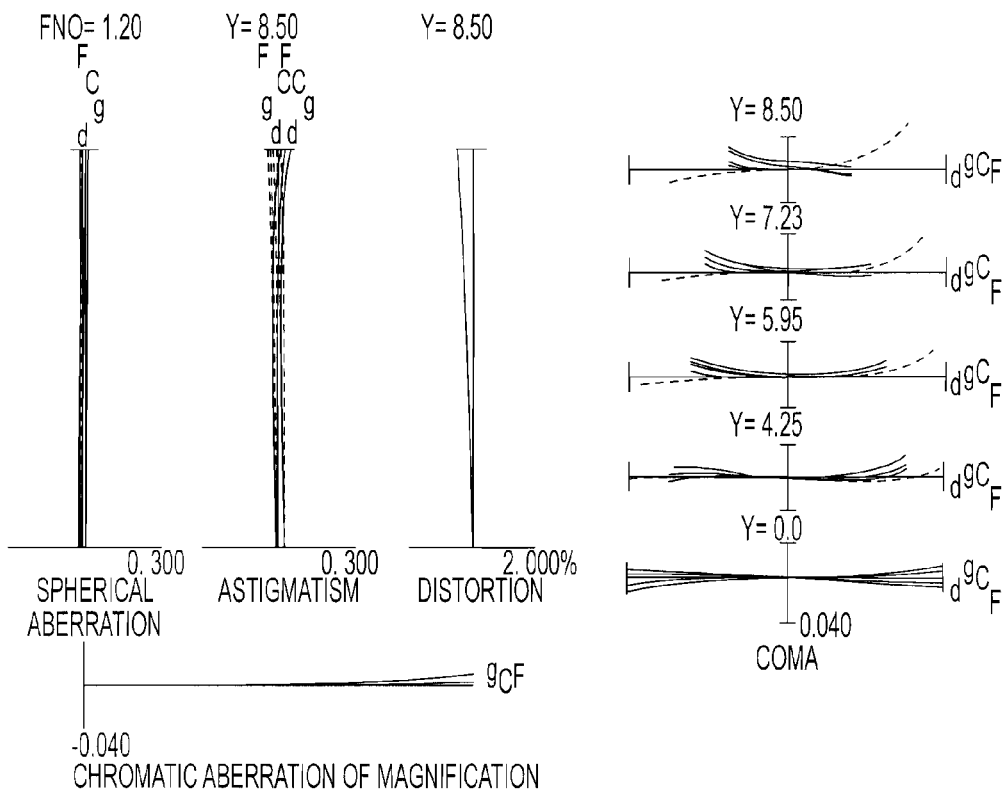
FIG. 4A is an aberration chart in Example 2 showing various aberrations in a state focused at infinity.
Figure 4B:
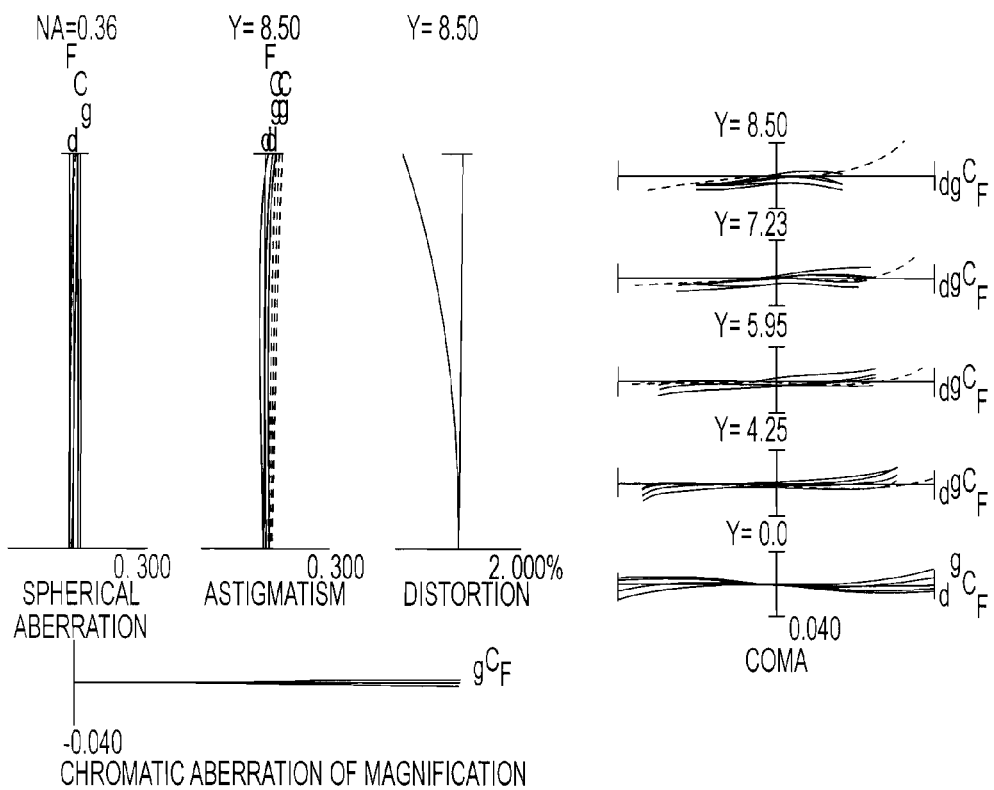
FIG. 4B is an aberration chart in Example 2 showing various aberrations in a state focused at a finite distance.

FIG. 4 shows various aberration charts of Example 2. FIG. 4A is an aberration chart showing various aberrations in a state focused at infinity, while FIG. 4B is an aberration chart showing various aberrations in a state focused at a finite distance. As can be seen from the aberration charts, various aberrations are favorably corrected in each focus state, whereby Example 2 has excellent image-forming performances.

Example 3

Figure 5:
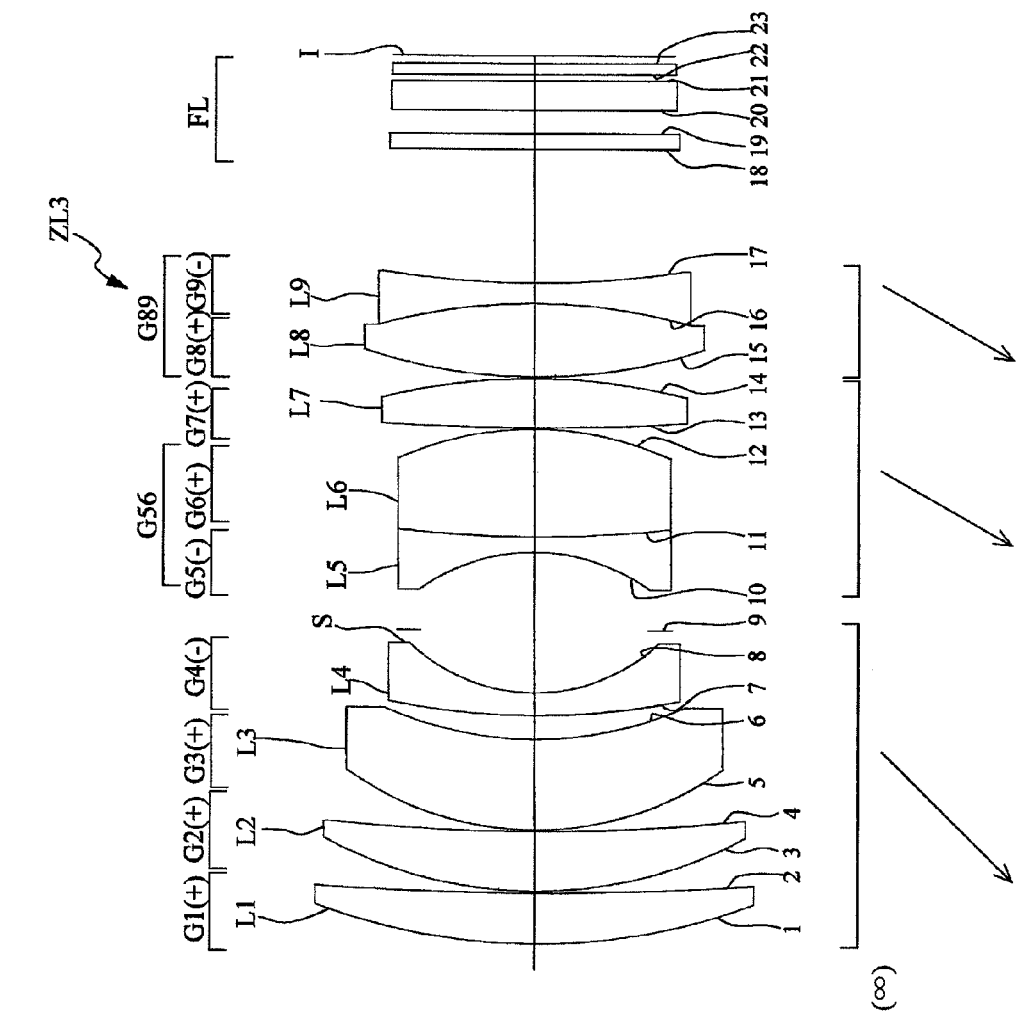
FIG. 5 is a sectional view showing the structure of the lens system in accordance with Example 3.

FIG. 5 is a view showing the structure of the lens system ZL3 in accordance with Example 3 of the present invention. Example 3 is an example of the first embodiment. In the lens system ZL3 of FIG. 5, the first lens component G1 is constituted by a positive meniscus lens L1 having a convex surface facing the object, the second lens component G2 is constituted by a positive meniscus lens L2 having a convex surface facing the object, the third lens component G3 is constituted by a positive meniscus lens L3 having a convex surface facing the object, the front-side negative lens component (fourth lens component) G4 is constituted by a negative meniscus lens L4 having a convex surface facing the object, the cemented lens G56 is constructed by cementing together the rear-side negative lens component G5 (fifth lens component) composed of a double concave lens L5 and the rear-side positive lens component G6 (sixth lens component) composed of a double convex lens L6, the seventh lens component G7 is constituted by a double convex positive lens L7, and the cemented lens G89 is constructed by cementing together an eighth lens G8 composed of a double convex lens L8 and a ninth lens G9 composed of a double concave lens L9.

Focusing from a long distance to a short distance is carried out by dividing the whole lens system ZL into three groups, i.e., a set of the lens components G1 to G4, a set of the lens components G5 to G7, and the cemented lens G89, and extending them separately toward the object. Upon focusing, the aperture stop S moves along the optical axis together with the front-side negative lens component G4. At the time of focusing, the set of lens components G1 to G4, the set of lens components G5 to G7, and the cemented lens G89 move faster in this order.

The following Table 7 lists values of data in Example 3.

TABLE 7 f = 32.0
F. NO = 1.2
2ω = 29.9
IH = 8.5
TLL = 57.2

| s | r | d | n | ν |
|---|---|---|---|---|
| 1 | 40.3452 | 3.29 | 1.4970 | 81.54 |
| 2 | 223.9692 | 0.10 | | |
| 3 | 28.3068 | 3.84 | 1.5924 | 68.36 |
| 4 | 127.2352 | 0.10 | | |
| 5 | 20.6648 | 5.85 | 1.8160 | 46.62 |
| 6 | 23.4794 | 1.55 | | |
| 7 | 46.6282 | 1.47 | 1.6727 | 32.10 |
| 8 | 11.4452 | 4.07 | | |
| 9 | 0.0000 | (d1) | | (aperture stop) |
| 10 | −12.5129 | 1.00 | 1.6989 | 30.13 |
| 11 | 77.8330 | 6.92 | 1.8830 | 40.76 |
| 12 | −21.0744 | 0.10 | | |
| 13 | 174.0421 | 3.16 | 1.7550 | 52.32 |
| 14 | −39.3712 | (d2) | | |
| 15 | 34.3162 | 4.76 | 1.8830 | 40.76 |
| 16 | −36.3229 | 1.30 | 1.7618 | 26.52 |
| 17 | 61.4220 | (d3) | | |
| 18 | 0.0000 | 1.00 | 1.5168 | 64.10 |

TABLE 7-continued f = 32.0
F. NO = 1.2
2ω = 29.9
IH = 8.5
TLL = 57.2

| s | r | d | n | ν |
|---|---|---|---|---|
| 19 | 0.0000 | 1.50 | | |
| 20 | 0.0000 | 1.87 | 1.5168 | 64.1 |
| 21 | 0.0000 | 0.40 | | |
| 22 | 0.0000 | 0.70 | 1.5168 | 64.1 |
| 23 | 0.0000 | 0.50 | | |

In Example 3, the axial air space d1 between the front-side negative lens component G4 and rear-side negative lens component G5, the axial air space d2 between the seventh lens component G7 and eighth lens component G8, and the axial air space d3 between the ninth lens component G9 and filter group FL vary upon focusing. The following Table 8 lists values of variable spaces at infinity and at a magnification of 1/13.6.

TABLE 8

| | Infinity | Magnification 1/13.6 |
|---|---|---|
| d1 | 5.02 | 5.96 |
| d2 | 0.10 | 2.72 |
| d3 | 8.64 | 9.77 |

The following Table 9 lists values corresponding to the conditional expressions in Example 3.

TABLE 9

| | |
|---|---|
| (1) (n1 + n2)/2 = 1.5447 | |
| (2) (ν1 + ν2)/2 = 74.95 | |
| (3) n8 = 1.8830 | |
| n9 = 1.7618 | |
| (4) ν8 = 40.76 | |
| ν9 = 26.52 | |
| (5) r8/f = 0.36 | |
| (6) f89/f = 1.78 | |

Figure 6A:
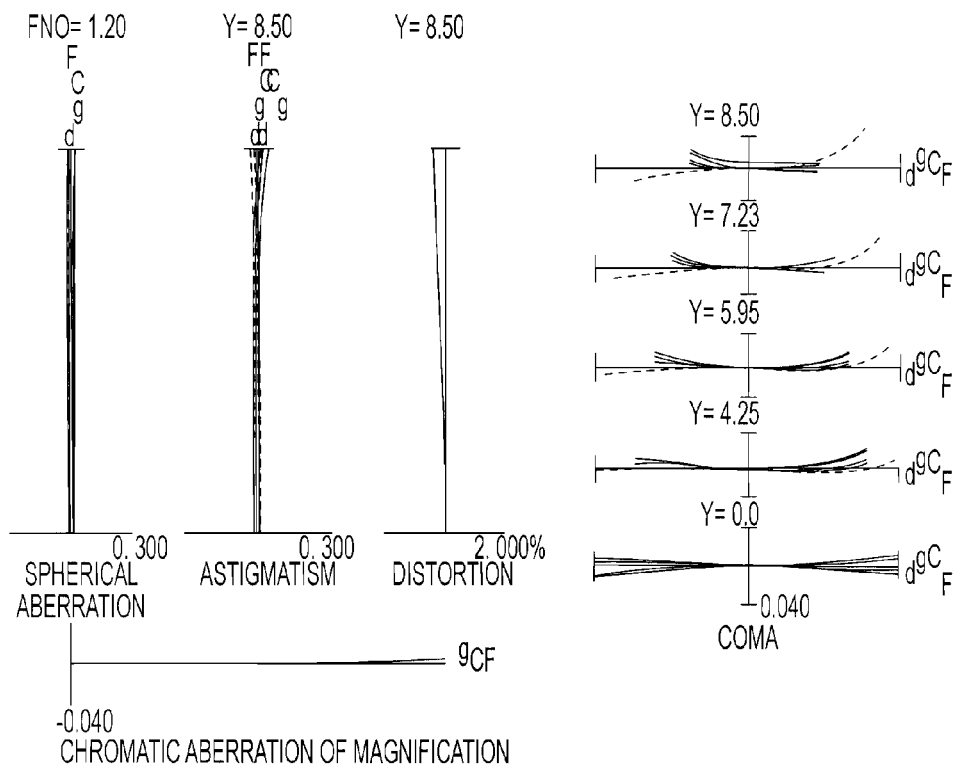
FIG. 6A is an aberration chart in Example 3 showing various aberrations in a state focused at infinity.
Figure 6B:
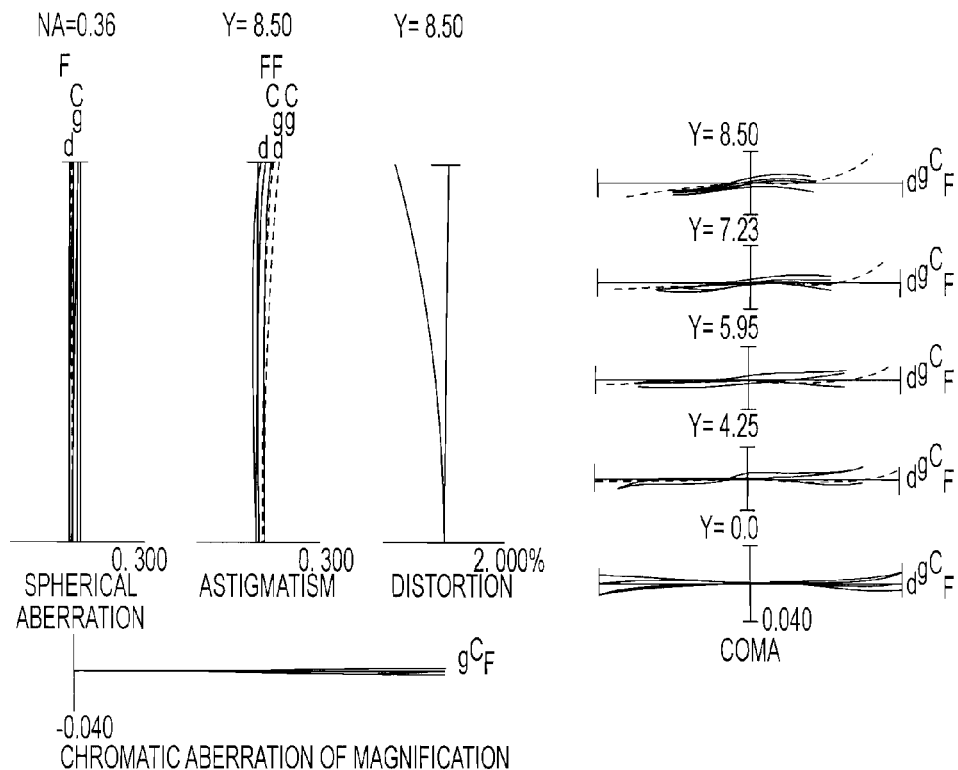
FIG. 6B is an aberration chart in Example 3 showing various aberrations in a state focused at a finite distance.

FIG. 6 shows various aberration charts of Example 3. FIG. 6A is an aberration chart showing various aberrations in a state focused at infinity, while FIG. 6B is an aberration chart showing various aberrations in a state focused at a finite distance. As can be seen from the aberration charts, various aberrations are favorably corrected in each focus state, whereby Example 3 has excellent image-forming performances.

Example 4

Figure 7:
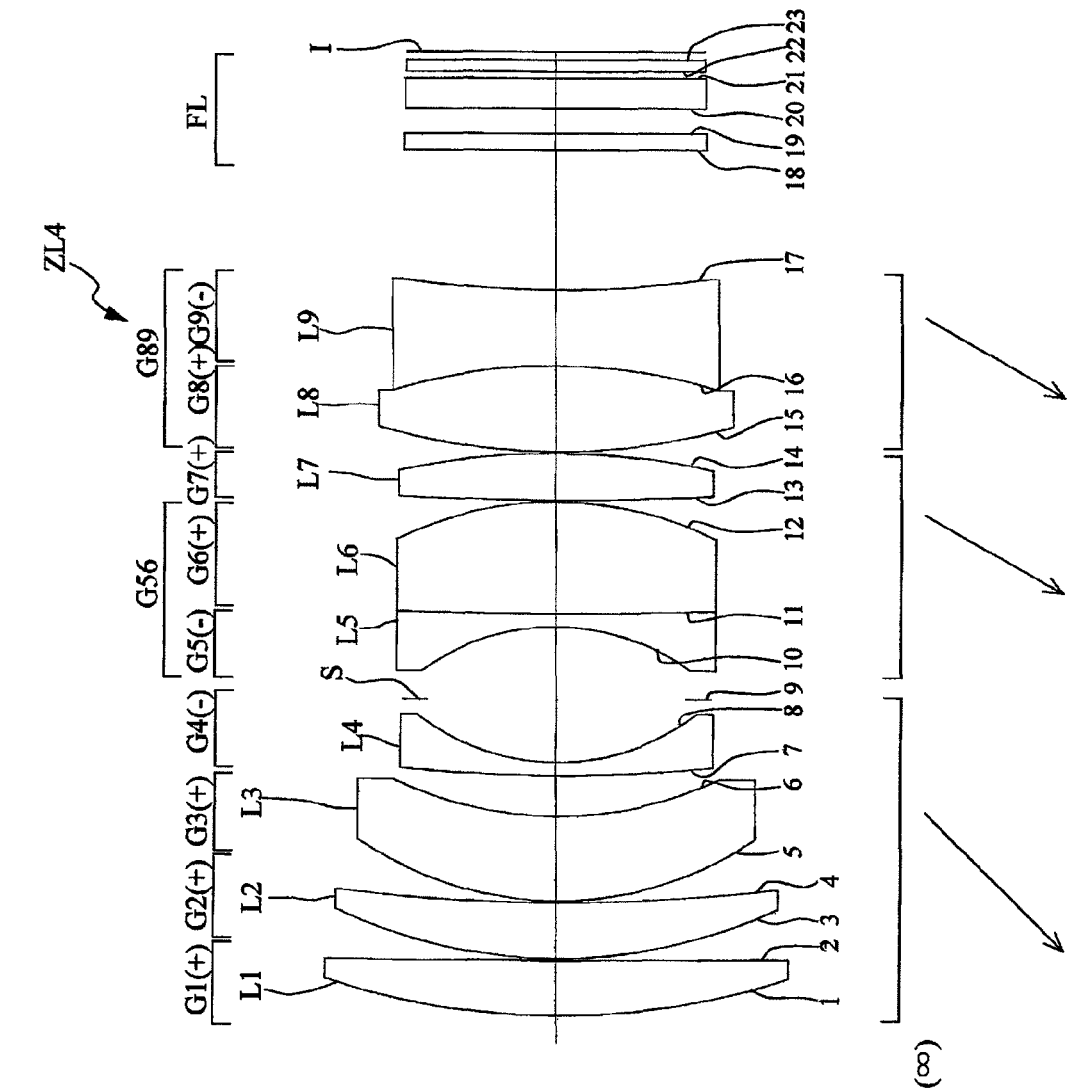
FIG. 7 is a sectional view showing the structure of the lens system in accordance with Example 4.

FIG. 7 is a view showing the structure of the lens system ZL4 in accordance with Example 4 of the present invention. Example 4 is an example of the first embodiment. In the lens system ZL4 of FIG. 7, the first lens component G1 is constituted by a positive meniscus lens L1 having a convex surface facing the object, the second lens component G2 is constituted by a positive meniscus lens L2 having a convex surface facing the object, the third lens component G3 is constituted by a positive meniscus lens L3 having a convex surface facing the object, the front-side negative lens component (fourth lens component) G4 is constituted by a negative meniscus lens L4 having a convex surface facing the object, the cemented lens G56 is constructed by cementing together the rear-side negative lens component G5 (fifth lens component) composed of a double concave lens L5 and the rear-side positive lens component G6 (sixth lens component) composed of a double convex lens L6, the seventh lens component G7 is constituted by a double convex positive lens L7, and the cemented lens G89 is constructed by cementing together an eighth lens G8 composed of a double convex lens L8 and a ninth lens G9 composed of a double concave lens L9.

Focusing from a long distance to a short distance is carried out by dividing the whole lens system ZL into three groups, i.e., a set of the lens components G1 to G4, a set of the lens components G5 to G7, and the cemented lens G89, and extending them separately toward the object. Upon focusing, the aperture stop S moves along the optical axis together with the front-side negative lens component G4. At the time of focusing, the set of lens components G1 to G4, the set of lens components G5 to G7, and the cemented lens G89 move faster in this order.

The following Table 10 lists values of data in Example 4.

TABLE 10 f = 32.0
F. NO = 1.2
2ω = 29.9
IH = 8.5
TLL = 58.7

| s | r | d | n | ν |
|---|---|---|---|---|
| 1 | 45.1295 | 3.37 | 1.5924 | 68.36 |
| 2 | 1436.3282 | 0.10 | | |
| 3 | 31.5479 | 3.39 | 1.5924 | 68.36 |
| 4 | 112.1635 | 0.10 | | |
| 5 | 21.2165 | 5.13 | 1.8160 | 46.62 |
| 6 | 22.6838 | 2.49 | | |
| 7 | 91.6166 | 0.80 | 1.6477 | 33.79 |
| 8 | 13.6500 | 3.88 | | |
| 9 | 0.0000 | (d1) | | (aperture stop) |
| 10 | −13.6776 | 0.80 | 1.6989 | 30.13 |
| 11 | 309.5468 | 6.84 | 1.8830 | 40.76 |
| 12 | −21.5615 | 0.10 | | |
| 13 | 184.5845 | 2.86 | 1.7550 | 52.32 |
| 14 | −44.1935 | (d2) | | |
| 15 | 38.4025 | 5.26 | 1.8830 | 40.76 |
| 16 | −33.3169 | 4.61 | 1.7618 | 26.52 |
| 17 | 68.0862 | (d3) | | |
| 18 | 0.0000 | 1.00 | 1.5168 | 64.10 |
| 19 | 0.0000 | 1.50 | | |
| 20 | 0.0000 | 1.87 | 1.5168 | 64.10 |
| 21 | 0.0000 | 0.40 | | |
| 22 | 0.0000 | 0.70 | 1.5168 | 64.10 |
| 23 | 0.0000 | 0.50 | | |

In Example 4, the axial air space d1 between the front-side negative lens component G4 and rear-side negative lens component G5, the axial air space d2 between the seventh lens component G7 and eighth lens component G8, and the axial air space d3 between the ninth lens component G9 and filter group FL vary upon focusing. The following Table 11 lists values of variable spaces at infinity and at a magnification of 1/13.6.

TABLE 11

| | Infinity | Magnification 1/13.6 |
|---|---|---|
| d1 | 4.43 | 5.21 |
| d2 | 0.10 | 2.31 |
| d3 | 8.47 | 9.95 |

The following Table 12 lists values corresponding to the conditional expressions in Example 4.

TABLE 12

(1) (n1 + n2)/2 = 1.5920
(2) (v1 + v2)/2 = 68.36
(3) n8 = 1.8830
    n9 = 1.7618
(4) v8 = 40.76
    v9 = 26.52
(5) r8/f = 0.43
(6) f89/f = 1.87

Figure 8A:
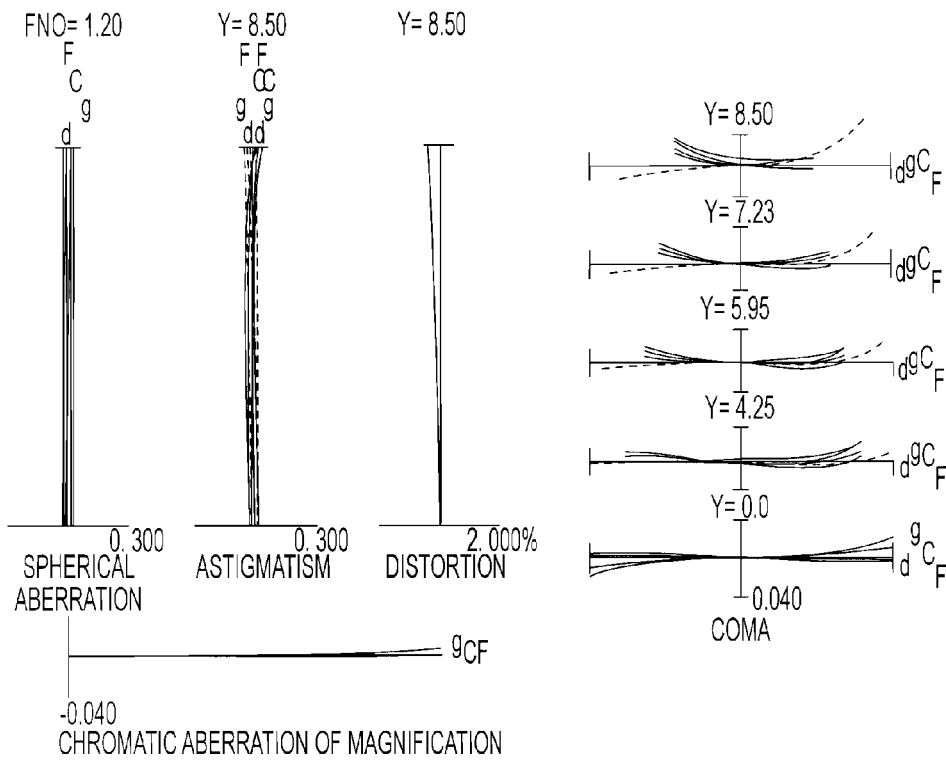
FIG. 8A is an aberration chart in Example 4 showing various aberrations in a state focused at infinity.
Figure 8B:
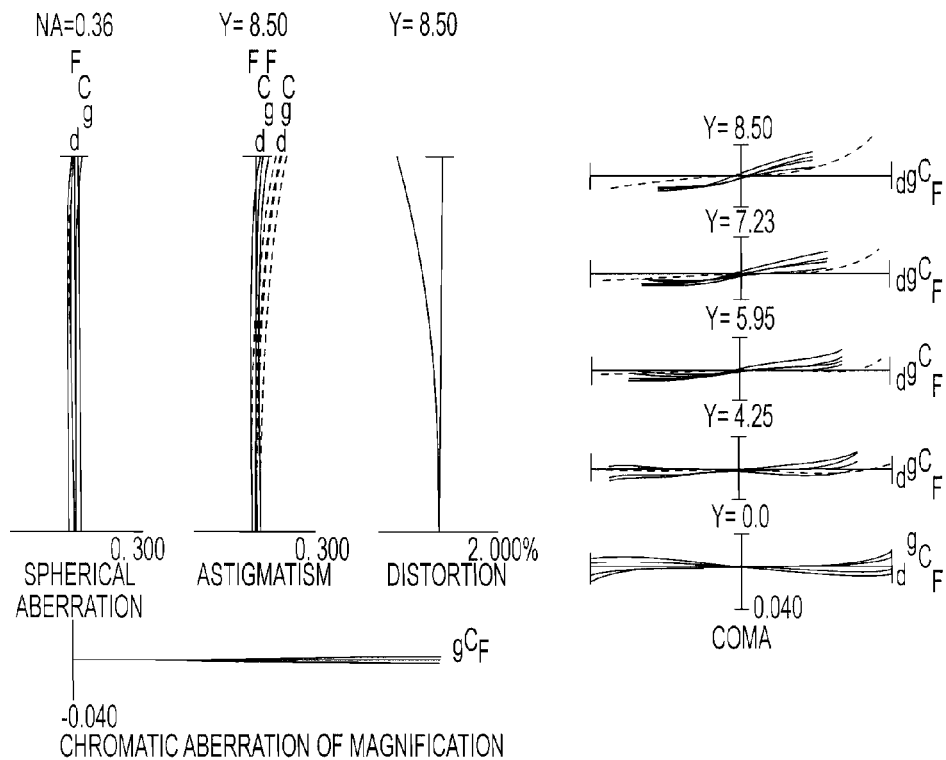
FIG. 8B is an aberration chart in Example 4 showing various aberrations in a state focused at a finite distance.

FIG. 8 shows various aberration charts of Example 4. FIG. 8A is an aberration chart showing various aberrations in a state focused at infinity, while FIG. 8B is an aberration chart showing various aberrations in a state focused at a finite distance. As can be seen from the aberration charts, various aberrations are favorably corrected in each focus state, whereby Example 4 has excellent image-forming performances.

Examples 5 to 8 in accordance with the second embodiment of the present invention will now be explained with reference to the drawings. FIGS. 11, 13, 15, and 17 are sectional views showing structures and refractive power distributions of lens systems SL (SL1 to SL4) in accordance with the examples and how their lens groups move when the focus state changes from a state focused at infinity to a state focused at a short distance. As shown in FIGS. 11, 13, 15, and 17 and described above, each of the lens systems SL1 to SL4 comprises, in order from the object along the optical axis, the front-side lens group GF (composed of the first to seventh lens components G1 to G7) having a positive refractive power and the rear-side lens group GR (cemented lens G89) having a positive refractive power, which are composed, in order from the object, of the first lens component G1 having a positive refractive power, the second lens component G2 having a positive refractive power, the third lens component G3 having a meniscus form with a convex surface facing the object, the fourth lens component (front-side negative lens component) G4 having a negative refractive power, the aperture stop S, the cemented lens G56 constructed by cementing together the fifth lens component (rear-side negative lens component) G5 having a negative refractive power and the sixth lens component (rear-side positive lens component) G6 having a positive refractive power, the seventh lens component G7 having a positive refractive power, the cemented lens G89 constructed by cementing a positive lens G8 and a negative lens G9 together, and a filter group FL. The filter group FL is constituted by a low-pass filter, an infrared cut filter, and the like. When the focus state changes from the state focused at infinity to the state focused at a short distance (i.e., upon focusing), the front-side lens group GF and the rear-side lens group GR move relative to the image surface, thereby varying the distance between the front-side lens group GF and the rear-side lens group GR. As shown in FIG. 19, the image surface I forms an image on the imaging device C (e.g., film, CCD, or CMOS).

Example 5

FIG. 11 is a view showing the structure of the lens system SL1 in accordance with Example 5 of the present invention. Example 5 is an example of the second embodiment. In the lens system SL1 of FIG. 11, the first lens component G1 is constituted by a positive meniscus lens L1 having a convex surface facing the object, the second lens component G2 is constituted by a positive meniscus lens L2 having a convex surface facing the object, the third lens component G3 is constituted by a positive meniscus lens L3 having a convex surface facing the object, the fourth lens component (front-side negative lens component) G4 is constituted by a negative meniscus lens L4 having a convex surface facing the object, the cemented lens G56 is constructed by cementing together the fifth lens component (rear-side negative lens component) G5 composed of a double concave lens L5 and the sixth lens component (rear-side positive lens component) G6 composed of a double convex lens L6, the seventh lens component G7 is constituted by a double convex positive lens L7, and the cemented lens G89 is constructed by cementing together an eighth lens G8 composed of a double convex lens L8 and a ninth lens G9 composed of a double concave lens L9. The foregoing structure of the lens system SL1 also applies to examples which will follow.

Focusing from infinity to an object at a short distance is carried out by separately extending the front-side lens group GF and the rear-side lens group GR toward the object. The aperture stop S is arranged within the front-side lens group GF (between the front-side negative lens component G4 and the rear-side negative lens component G5 as mentioned above) and moves together with the front-side lens group GF upon focusing from infinity to the object at a short distance. These also apply to examples which will follow.

The following Table 13 lists values of data in Example 5.

In Table 13, f, F.NO, 2ω, and Bf denote the focal length, f-number, angle of view, and back focus, respectively. The surface number indicates the lens surface number counted in order from the object along the advancing direction of light beams, the surface distance indicates the distance on the optical axis from each optical surface to the next optical surface, and the refractive index and Abbe number refer to their values at d-line (λ=587.6 nm). The total lens length indicates the length on the optical axis from the first lens surface to the image surface when focused at infinity. While "mm" is generally used for the unit of lengths such as focal length f, radius of curvature r, and surface distance d listed in all of the following data values, the unit is not limited thereto, since optical systems can attain similar optical performances even after being proportionally enlarged or reduced. The radius of curvature of 0.0000 indicates a plane, while the refractive index of air, which is 1.00000, is omitted. These explanations of symbols and data tables also apply to examples which will follow.

TABLE 13 f = 32.00
F. NO = 1.24
2ω = 29.86
IH = 8.50
TLL = 56.13

| s | r | d | n | v |
|---|---|---|---|---|
| 1 | 35.6570 | 5.50 | 1.59319 | 67.87 |
| 2 | 329.8920 | 0.30 | | |
| 3 | 22.5026 | 4.30 | 1.59319 | 67.87 |
| 4 | 63.9805 | 0.20 | | |
| 5 | 21.4046 | 5.10 | 1.81600 | 46.63 |
| 6 | 21.5939 | 1.30 | | |
| 7 | 57.8235 | 1.30 | 1.67270 | 32.11 |
| 8 | 10.5445 | 4.90 | | |
| 9 | 0.0000 | 4.00 | | (aperture stop S) |
| 10 | −11.2740 | 1.30 | 1.69895 | 30.13 |
| 11 | 56.3778 | 4.35 | 1.88300 | 40.77 |
| 12 | −19.0149 | 0.15 | | |
| 13 | 585.3078 | 2.85 | 1.75500 | 52.29 |

TABLE 13-continued f = 32.00
F. NO = 1.24
2ω = 29.86
IH = 8.50
TLL = 56.13

| s | r | d | n | ν |
|---|---|---|---|---|
| 14 | −33.3610 | (d14) | | |
| 15 | 40.4389 | 4.30 | 1.88300 | 40.77 |
| 16 | −29.4995 | 1.40 | 1.76182 | 26.56 |
| 17 | 880.5274 | (d17) | | |
| 18 | 0.0000 | 0.50 | 1.51680 | 64.12 |
| 19 | 0.0000 | 4.60 | | |
| 20 | 0.0000 | 1.87 | 1.51680 | 64.12 |
| 21 | 0.0000 | 0.30 | | |
| 22 | 0.0000 | 0.70 | 1.51680 | 64.12 |
| 23 | 0.0000 | (Bf) | | |

In Example 5, the axial air space d14 between the front-side lens group GF and rear-side lens group GR and the axial air space d17 between the rear-side lens group GR and filter group FL vary upon focusing. The following Table 14 lists values of each group space in states focused at infinity, an intermediate shooting distance, and a short distance, respectively. The intermediate shooting distance is a shooting distance at a magnification of −0.01, while the short distance is a shooting distance at a magnification of −0.07. These definitions also apply to examples which will follow.

TABLE 14

| | IF | ID | SD |
|---|---|---|---|
| d14 | 1.2000 | 1.4261 | 3.2405 |
| d17 | 5.1894 | 5.4248 | 6.8031 |
| Bf | 0.5160 | 0.5160 | 0.5160 |

The following Table 15 lists values corresponding to the conditional expressions in Example 5. In Table 15, f, fF, fR, f9, r8, n8, n9, ν8, and ν9 denote the focal length of the lens system SL as a whole, the focal length of the front-side lens group GF, the focal length of the rear-side lens group GR, the focal length of the negative lens G9 in the rear-side lens group GR, the radius of curvature of the eighth surface on the image side of the fourth lens component G4, the refractive index of the positive lens G8 at d-line, the refractive index of the positive lens G9 at d-line, the Abbe number of the positive lens G8, and the Abbe number of the negative lens G9, respectively. The foregoing explanations of symbols also apply to examples which will follow.

TABLE 15 f = 32.0013
fF = 52.0532
fR = 40.1057
f9 = −37.4422
r8 = 10.5445
n8 = 1.88300
n9 = 1.76182
ν8 = 40.77
ν9 = 26.56
(1) fF/fR = 1.2979
(2) (−f9)/f = 1.1700
(3) r8/f = 0.3295
(4) n8 > n9: 1.88300 > 1.76182
(5) ν8 > ν9: 40.77 > 26.56
(6) fR/f = 1.2533

The following Table 16 lists values corresponding to the conditional expressions in Example 5. In Table 16, ν1, ν2, γF1, γR1, n1, n2, γF2, γR2, n8, n9, ν8, ν9, r8, f, and fR denote the Abbe number of the first lens component G1, the Abbe number of the second lens component G2, the amount of movement of the front-side lens group GF upon focusing from infinity to a magnification of −0.01, the amount of movement of the rear-side lens group GR upon focusing from infinity to the magnification of −0.01, the refractive index of the first lens component G1 at d-line, the amount of movement of the front-side lens group GF upon focusing from infinity to a magnification of −0.07, the amount of movement of the rear-side lens group GR upon focusing from infinity to the magnification of −0.07, the Abbe number of the positive lens G8 at d-line, the Abbe number of the negative lens G9 at d-line, the radius of curvature of the image-side surface (eighth surface) of the front-side negative lens component G4, the focal length of the lens system SL as a whole, and the focal length of the rear-side lens group GR, respectively. The foregoing explanations of symbols also apply to examples which will follow.

TABLE 16

ν1 = 67.87
ν2 = 67.87
γF1 = −0.4614
γR1 = −0.2354
n1 = 1.59319
n2 = 1.59319
γF2 = −3.6542
γR2 = −1.6137
n8 = 1.88300
n9 = 1.76182
ν8 = 40.77
ν9 = 26.56
r8 = 10.5445
f = 32.0013
fR = 40.1057
(1) (ν1 + ν2)/2 = 67.87
(2) γR1/γF1 = 0.5102
(3) (n1 + n2)/2 = 1.59319
(4) γR2/γF2 = 0.4416
(5) n8 > n9: 1.88300 > 1.76182
(6) ν8 > ν9: 40.77 > 26.56
(7) r8/f = 0.3295
(8) fR/f = 1.2533

Figure 12A:
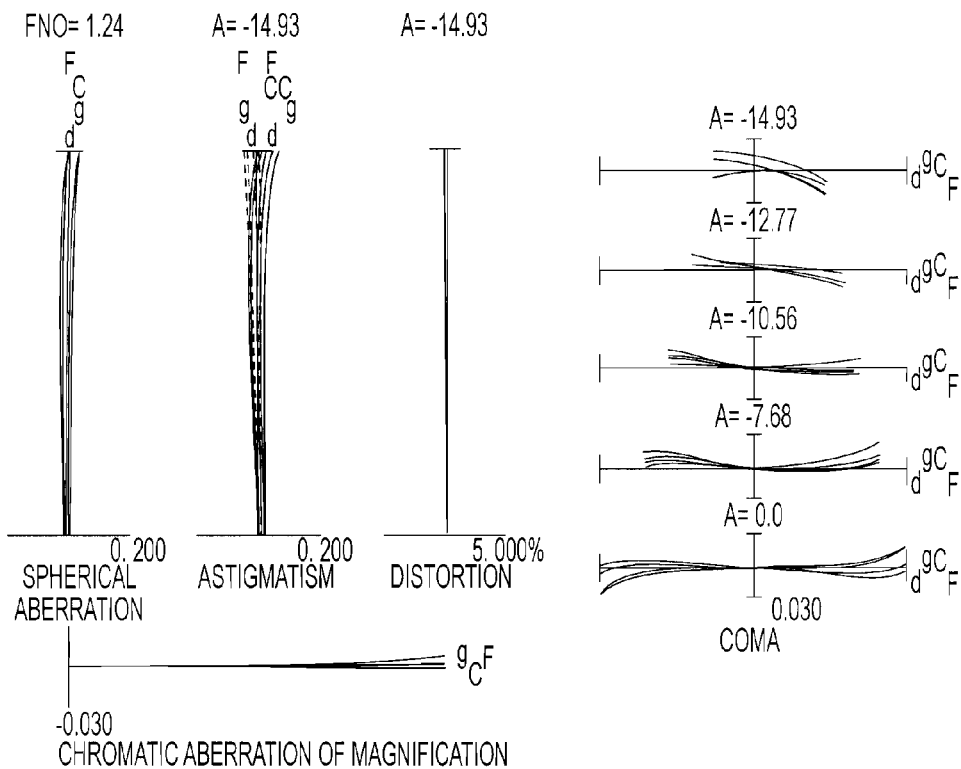
FIG. 12A is an aberration chart in Example 5 showing various aberrations in a state focused at infinity.
Figure 12B:
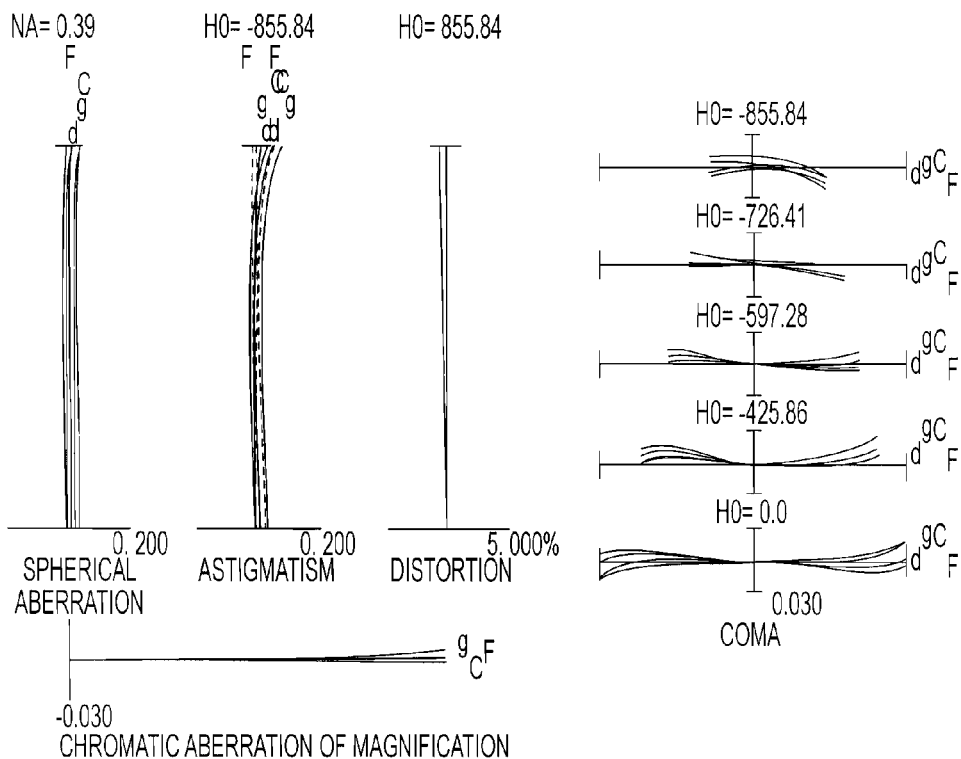
FIG. 12B is an aberration chart in Example 5 showing various aberrations in a state focused at an intermediate shooting distance.
Figure 12C:
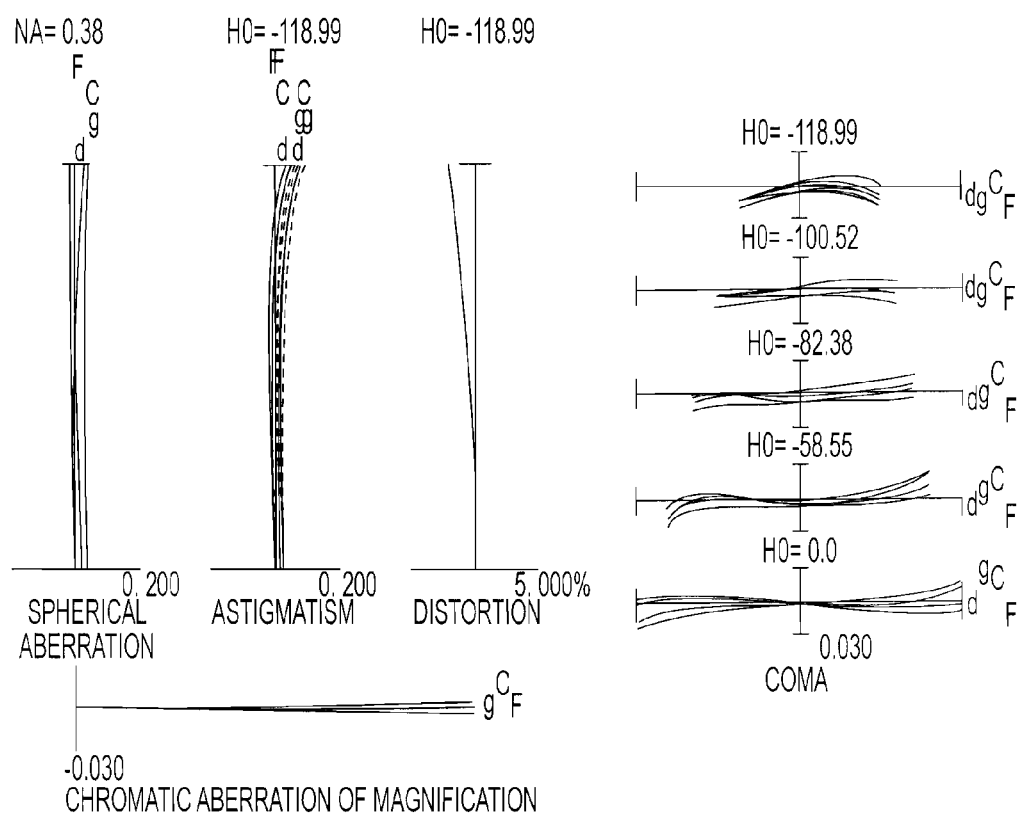
FIG. 12C is an aberration chart in Example 5 showing various aberrations in a state focused at a short distance.

FIG. 12 shows various aberration charts of Example 5. FIG. 12A is an aberration chart showing various aberrations in a state focused at infinity. FIG. 12B is an aberration chart showing various aberrations in a state focused at an intermediate shooting distance with a magnification of −0.01. FIG. 12C is an aberration chart showing various aberrations in a state focused at a short distance with a magnification of −0.07. In each aberration chart, FNO, NA, A, HO, d, g, C, and F indicate the f-number, numerical aperture, half angle of view, object height, d-line (λ=587.6 nm), g-line (λ=435.6 nm), C-line (λ=656.3 nm), and F-line (λ=486.1 nm), respectively. In each astigmatism chart, solid and broken lines indicate sagittal and meridional image surfaces, respectively. These explanations of the aberration charts also apply to the following examples. As can be seen from the aberration charts, various aberrations are favorably corrected in each focus state, whereby Example 5 has excellent image-forming performances.

Example 6

Figure 13:
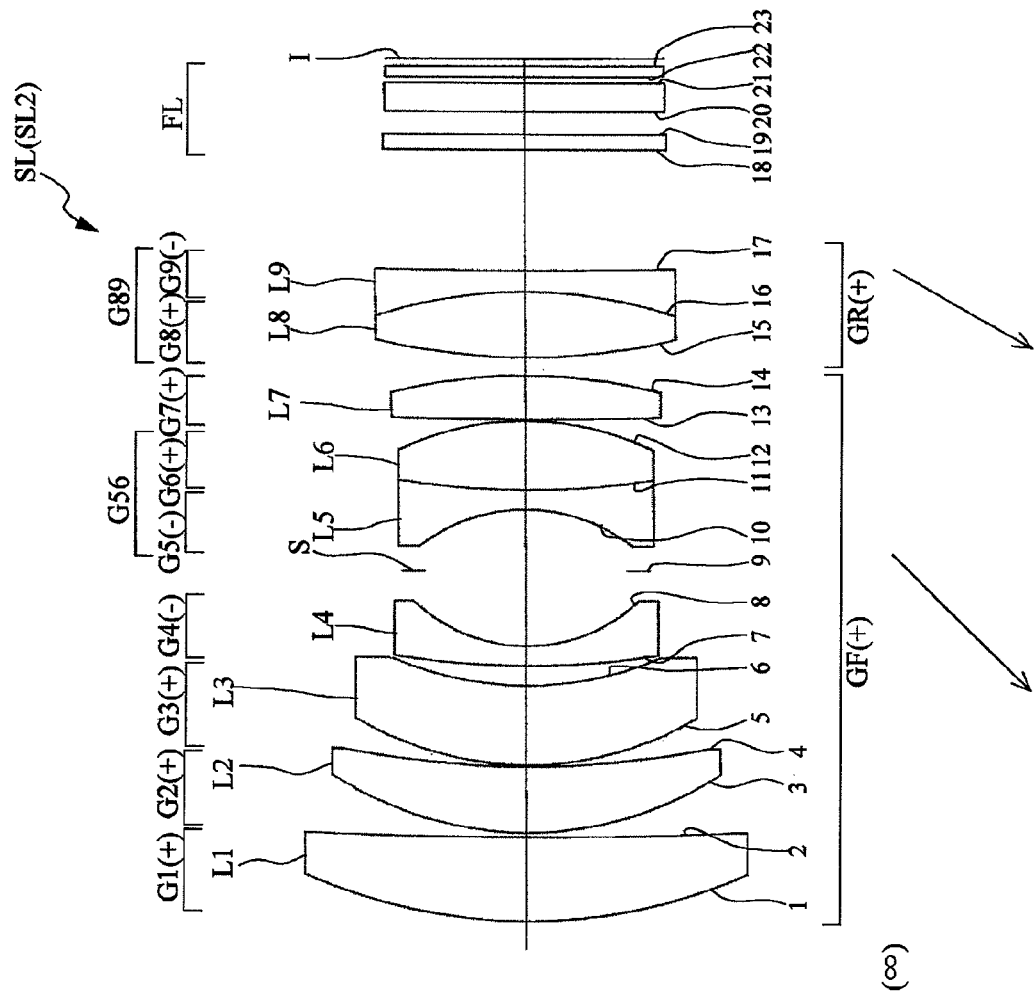
FIG. 13 is a sectional view showing the structure of the lens system in accordance with Example 6.

FIG. 13 is a view showing the structure of the lens system SL2 in accordance with Example 6 of the present invention. Example 6 is an example of the second embodiment. The structure of the lens system SL2 shown in FIG. 13 is the same as that of the lens system SL1 in accordance with Example 5. The following Table 17 lists values of data in Example 6.

TABLE 17 f = 32.00
F. NO = 1.23
2ω = 29.87
IH = 8.50
TLL = 56.42

| s | r | d | n | ν |
|---|---|---|---|---|
| 1 | 35.2403 | 5.50 | 1.59319 | 67.87 |
| 2 | 320.9635 | 0.30 | | |
| 3 | 23.0116 | 4.30 | 1.59319 | 67.87 |
| 4 | 61.7430 | 0.10 | | |
| 5 | 21.5169 | 5.20 | 1.81600 | 46.62 |
| 6 | 22.0129 | 1.30 | | |
| 7 | 55.3189 | 1.30 | 1.67270 | 32.10 |
| 8 | 10.6045 | 4.90 | | |
| 9 | 0.0000 | 4.00 | | (aperture stop S) |
| 10 | −11.2748 | 1.30 | 1.69895 | 30.13 |
| 11 | 55.2195 | 4.50 | 1.88300 | 40.76 |
| 12 | −18.8925 | 0.10 | | |
| 13 | 301.4844 | 2.85 | 1.75500 | 52.32 |
| 14 | −34.5531 | (d14) | | |
| 15 | 41.3343 | 4.30 | 1.88300 | 40.76 |
| 16 | −31.0688 | 1.40 | 1.76182 | 26.52 |
| 17 | 458.1219 | (d17) | | |
| 18 | 0.0000 | 1.00 | 1.51680 | 64.10 |
| 19 | 0.0000 | 1.50 | | |
| 20 | 0.0000 | 1.87 | 1.51680 | 64.10 |
| 21 | 0.0000 | 0.40 | | |
| 22 | 0.0000 | 0.70 | 1.51680 | 64.10 |
| 23 | 0.0000 | (Bf) | | |

In Example 6, the axial air space d14 between the front-side lens group GF and rear-side lens group GR and the axial air space d17 between the rear-side lens group GR and filter group FL vary upon focusing. The following Table 18 lists values of each group space in states focused at infinity, an intermediate shooting distance, and a short distance, respectively.

TABLE 18

| | IF | ID | SD |
|---|---|---|---|
| d14 | 1.2000 | 1.4382 | 3.3177 |
| d17 | 7.9043 | 8.1353 | 9.4426 |
| Bf | 0.5000 | 0.5000 | 0.5000 |

The following Table 19 lists values corresponding to the conditional expressions in Example 6.

TABLE 19 f = 32.0001
fF = 50.5104
fR = 42.5105
f9 = −38.1450
r8 = 10.6045
n8 = 1.88300
n9 = 1.76182
ν8 = 40.76
ν9 = 26.52
(1) fF/fR = 1.1882
(2) (−f9)/f = 1.1920
(3) r8/f = 0.3314
(4) n8 > n9: 1.88300 > 1.76182
(5) ν8 > ν9: 40.76 > 26.52
(6) fR/f = 1.3284

The following Table 20 lists values corresponding to the conditional expressions in Example 6.

TABLE 20

ν1 = 67.87
ν2 = 67.87
γF1 = −0.4692
γR1 = −0.2310
n1 = 1.59319
n2 = 1.59319
γF2 = −3.6560
γR2 = −1.5383
n8 = 1.88300
n9 = 1.76182
ν8 = 40.76
ν9 = 26.52
r8 = 10.6045
f = 32.0001
fR = 42.5105
(1) (ν1 + ν2)/2 = 67.87
(2) γR1/γF1 = 0.4923
(3) (n1 + n2)/2 = 1.59319
(4) γR2/γF2 = 0.4208
(5) n8 > n9: 1.88300 > 1.76182
(6) ν8 > ν9: 40.76 > 26.52
(7) r8/f = 0.3314
(8) fR/f = 1.3284

Figure 14A:
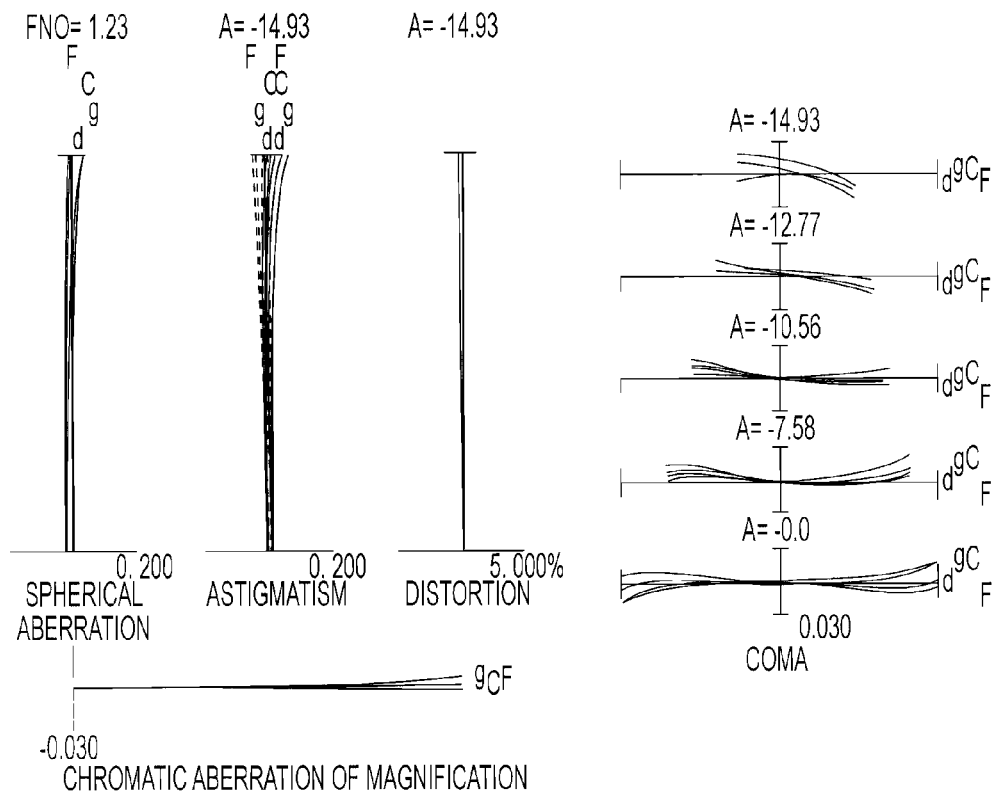
FIG. 14A is an aberration chart in Example 6 showing various aberrations in a state focused at infinity.
Figure 14B:
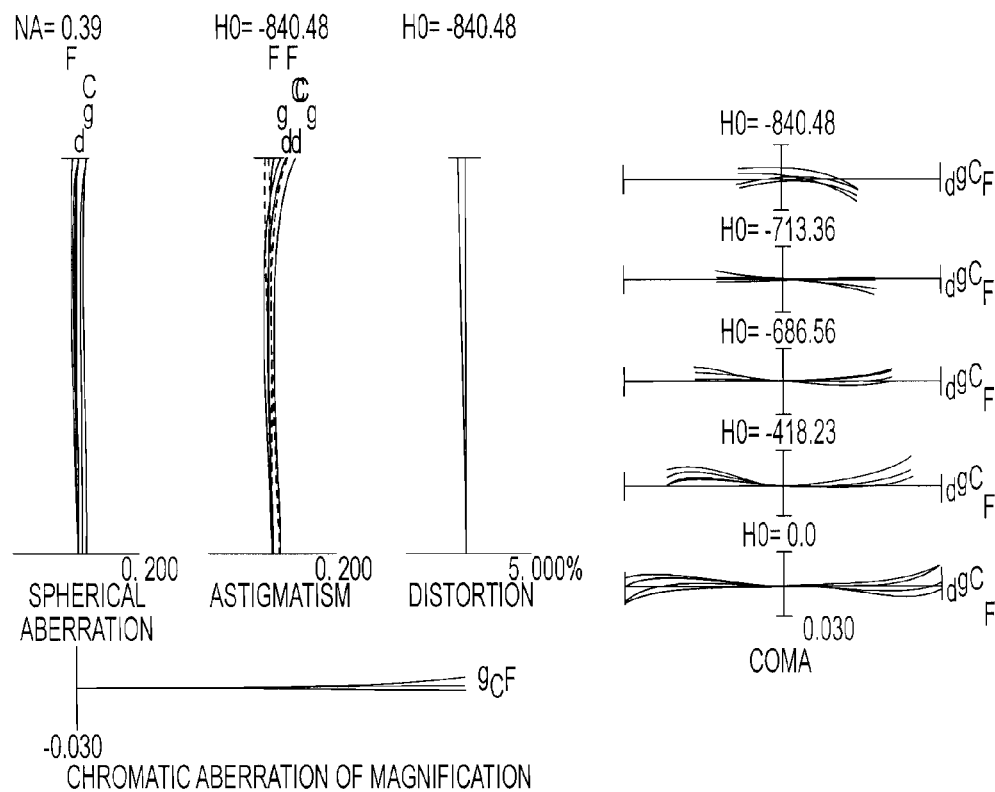
FIG. 14B is an aberration chart in Example 6 showing various aberrations in a state focused at an intermediate shooting distance.
Figure 14C:
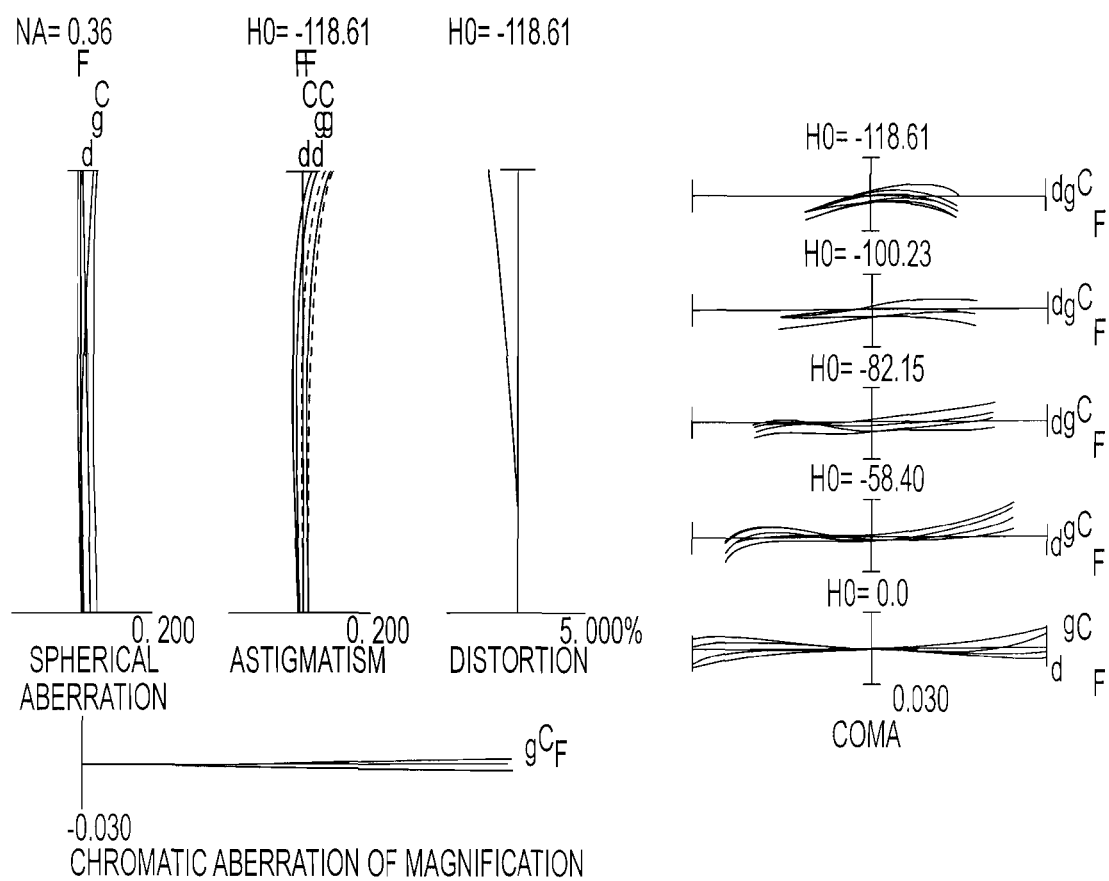
FIG. 14C is an aberration chart in Example 6 showing various aberrations in a state focused at a short distance.

FIG. 14 shows various aberration charts of Example 6. FIG. 14A is an aberration chart showing various aberrations in a state focused at infinity. FIG. 14B is an aberration chart showing various aberrations in a state focused at an intermediate shooting distance with a magnification of −0.01. FIG. 14C is an aberration chart showing various aberrations in a state focused at a short distance with a magnification of −0.07. As can be seen from the aberration charts, various aberrations are favorably corrected in each focus state, whereby Example 6 has excellent image-forming performances.

Example 7

Figure 15:
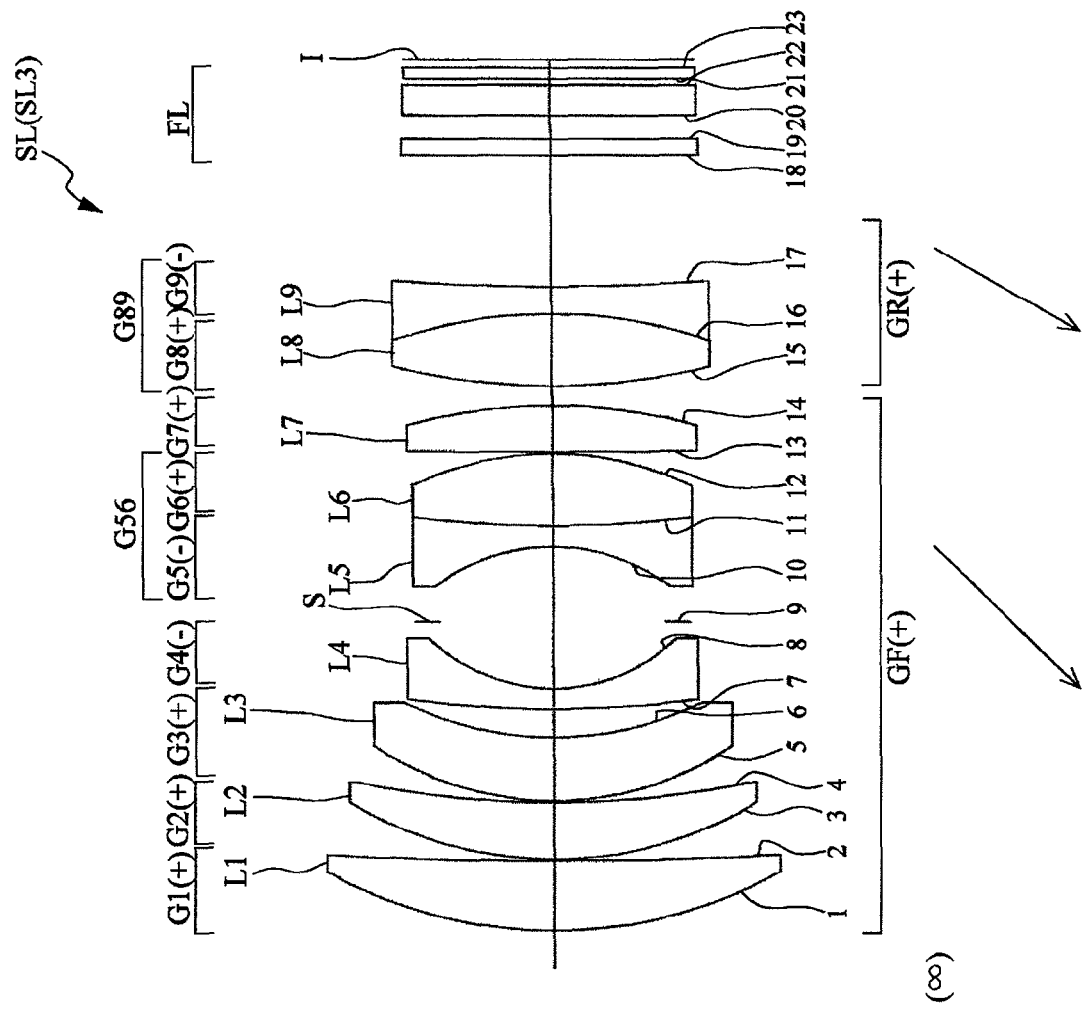
FIG. 15 is a sectional view showing the structure of the lens system in accordance with Example 7.

FIG. 15 is a view showing the structure of the lens system SL3 in accordance with Example 7 of the present invention. Example 7 is an example of the second embodiment. The structure of the lens system SL3 shown in FIG. 15 is the same as that of the lens system SL1 in accordance with Example 5. The following Table 21 lists values of data in Example 7.

TABLE 21 f = 32.00
F. NO = 1.23
2ω = 29.87
IH = 8.50
TLL = 54.44

| s | r | d | n | ν |
|---|---|---|---|---|
| 1 | 28.9228 | 4.35 | 1.59240 | 68.36 |
| 2 | 268.2548 | 0.10 | | |
| 3 | 24.4064 | 3.53 | 1.59240 | 68.36 |
| 4 | 60.0552 | 0.10 | | |
| 5 | 19.8422 | 3.97 | 1.81600 | 46.62 |
| 6 | 20.9876 | 1.77 | | |
| 7 | 68.6280 | 1.30 | 1.67270 | 32.10 |
| 8 | 10.9636 | 4.16 | | |
| 9 | 0.0000 | 4.76 | | (aperture stop S) |
| 10 | −11.7583 | 1.30 | 1.67270 | 32.10 |
| 11 | 70.5542 | 4.53 | 1.88300 | 40.76 |
| 12 | −19.8231 | 0.10 | | |
| 13 | 861.2368 | 2.91 | 1.75500 | 52.32 |
| 14 | −33.5214 | (d14) | | |
| 15 | 40.3110 | 4.53 | 1.88300 | 40.76 |
| 16 | −29.5297 | 1.67 | 1.76182 | 26.52 |
| 17 | 129.4578 | (d17) | | |
| 18 | 0.0000 | 1.00 | 1.51680 | 64.10 |
| 19 | 0.0000 | 1.50 | | |
| 20 | 0.0000 | 1.87 | 1.51680 | 64.10 |

TABLE 21-continued f = 32.00
F. NO = 1.23
2ω = 29.87
IH = 8.50
TLL = 54.44

| s | r | d | n | ν |
|---|---|---|---|---|
| 21 | 0.0000 | 0.40 | | |
| 22 | 0.0000 | 0.70 | 1.51680 | 64.10 |
| 23 | 0.0000 | (Bf) | | |

In Example 7, the axial air space d14 between the front-side lens group GF and rear-side lens group GR and the axial air space d17 between the rear-side lens group GR and filter group FL vary upon focusing. The following Table 22 lists values of each group space in states focused at infinity, an intermediate shooting distance, and a short distance, respectively.

TABLE 22

| | IF | ID | SD |
|---|---|---|---|
| d14 | 1.2000 | 1.3739 | 3.4519 |
| d17 | 8.1721 | 8.4228 | 9.5938 |
| Bf | 0.5000 | 0.5000 | 0.5000 |

The following Table 23 lists values corresponding to the conditional expressions in Example 7.

TABLE 23 f = 32.0003
fF = 48.5085
fR = 49.1132
f9 = −31.4199
r8 = 10.9636
n8 = 1.88300
n9 = 1.76182
ν8 = 40.76
ν9 = 26.52
(1) fF/fR = 0.9877
(2) (−f9)/f = 0.9819
(3) r8/f = 0.3426
(4) n8 > n9: 1.88300 > 1.76182
(5) ν8 > ν9: 40.76 > 26.52
(6) fR/f = 1.5348

The following Table 24 lists values corresponding to the conditional expressions in Example 7.

TABLE 24

ν1 = 68.36
ν2 = 68.36
γF1 = −0.4247
γR1 = −0.2507
n1 = 1.59240
n2 = 1.59240
γF2 = −3.6735
γR2 = −1.4217
n8 = 1.88300
n9 = 1.76182
ν8 = 40.76
ν9 = 26.52
r8 = 10.9636
f = 32.0003
fR = 49.1132
(1) (ν1 + ν2)/2 = 68.36
(2) γR1/γF1 = 0.5903
(3) (n1 + n2)/2 = 1.59240
(4) γR2/γF2 = 0.3870

TABLE 24-continued (5) n8 > n9: 1.88300 > 1.76182
(6) ν8 > ν9: 40.76 > 26.52
(7) r8/f = 0.3426
(8) fR/f = 1.5348

Figure 16A:
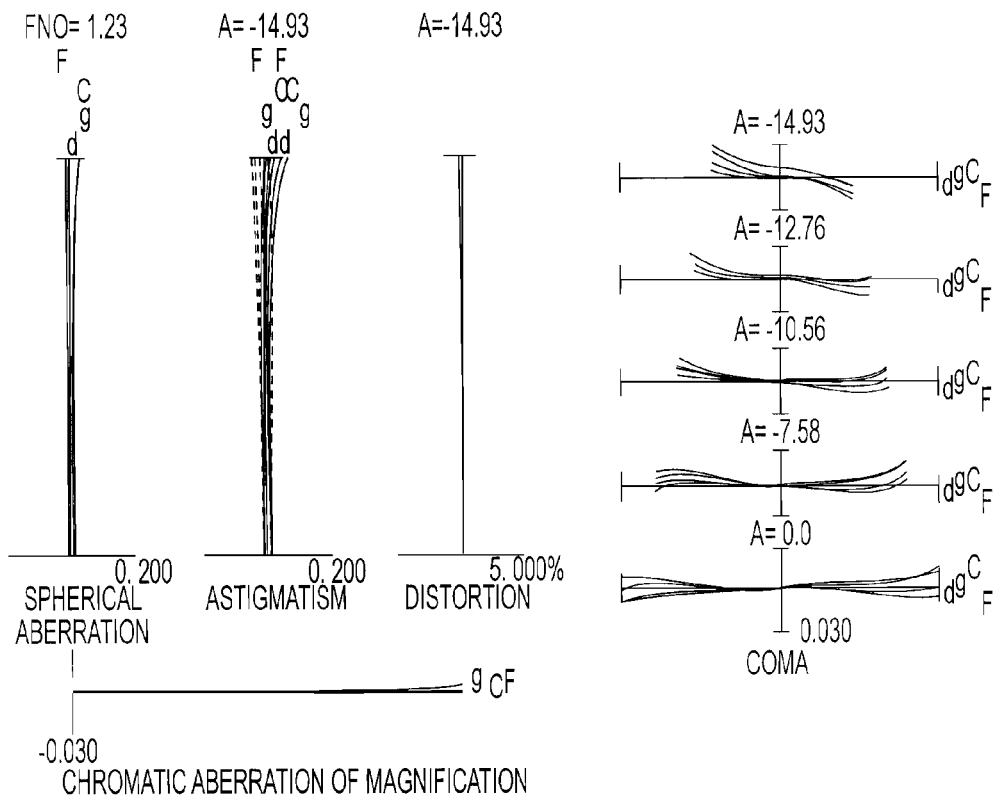
FIG. 16A is an aberration chart in Example 7 showing various aberrations in a state focused at infinity.
Figure 16B:
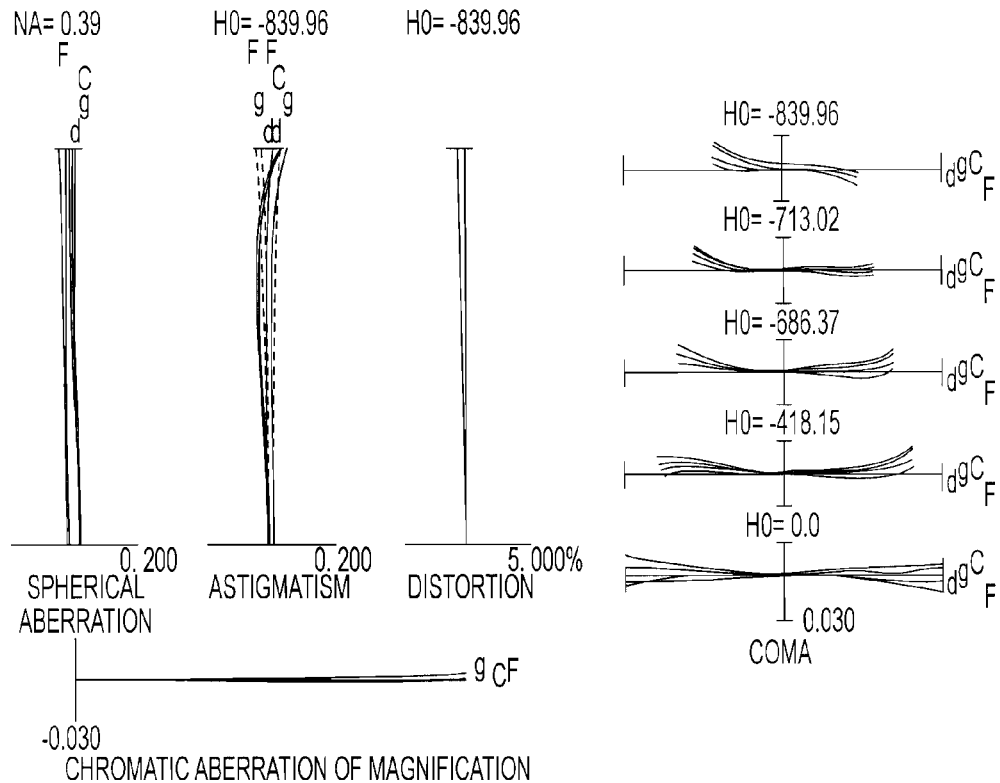
FIG. 16B is an aberration chart in Example 7 showing various aberrations in a state focused at an intermediate shooting distance.
Figure 16C:
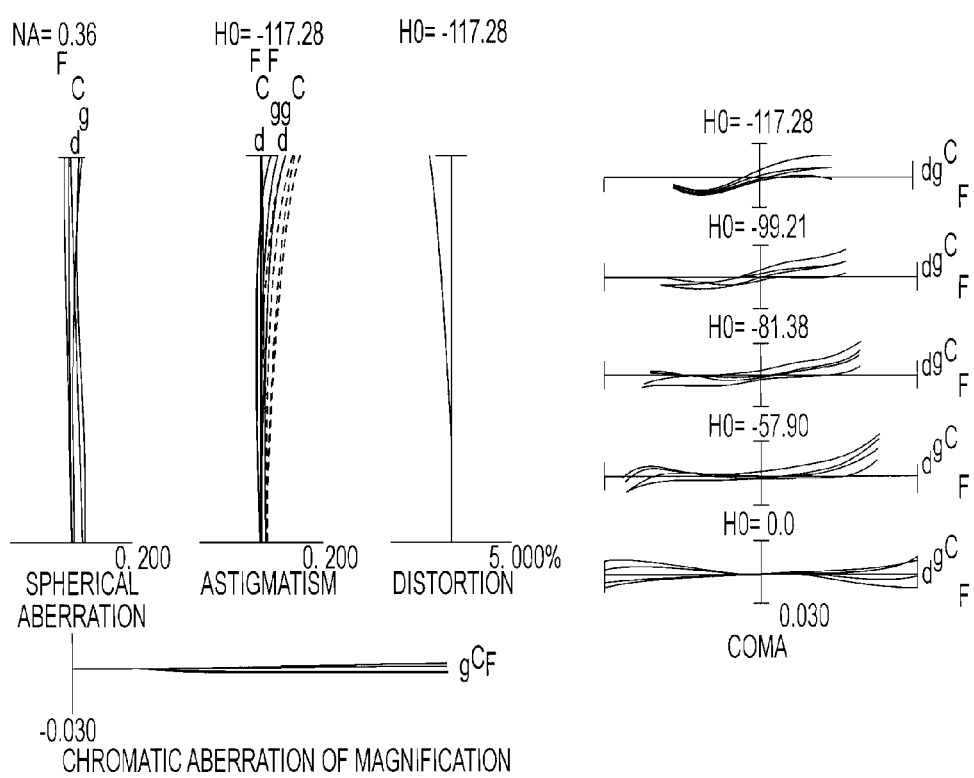
FIG. 16C is an aberration chart in Example 7 showing various aberrations in a state focused at a short distance.

FIG. 16 shows various aberration charts of Example 7. FIG. 16A is an aberration chart showing various aberrations in a state focused at infinity. FIG. 16B is an aberration chart showing various aberrations in a state focused at an intermediate shooting distance with a magnification of −0.01. FIG. 16C is an aberration chart showing various aberrations in a state focused at a short distance with a magnification of −0.07. As can be seen from the aberration charts, various aberrations are favorably corrected in each focus state, whereby Example 7 has excellent image-forming performances.

Example 8

Figure 17:
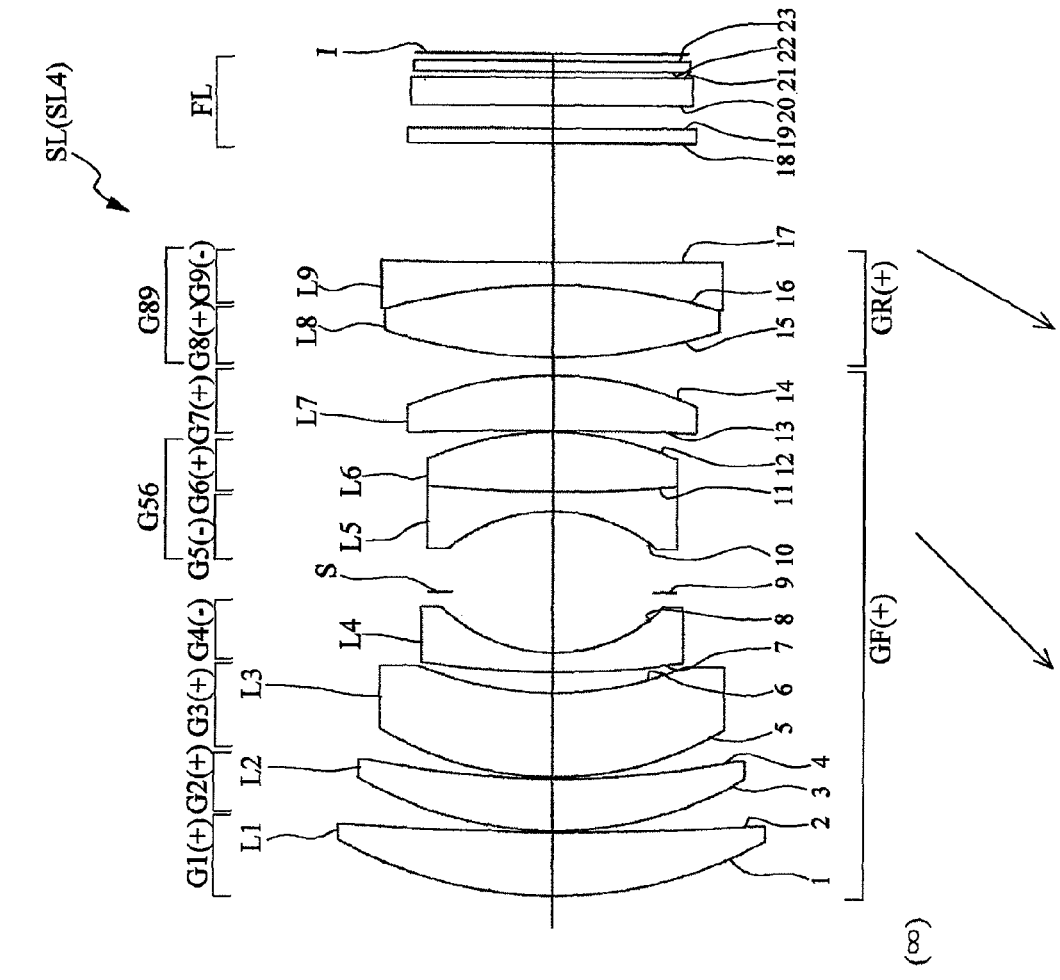
FIG. 17 is a sectional view showing the structure of the lens system in accordance with Example 8.

FIG. 17 is a view showing the structure of the lens system SL4 in accordance with Example 8 of the present invention. Example 8 is an example of the second embodiment. The structure of the lens system SL4 shown in FIG. 17 is the same as that of the lens system SL1 in accordance with Example 5 except that the seventh lens component G7 is constituted by a positive meniscus lens L7 having a convex surface facing the image. The following Table 25 lists values of data in Example 8.

TABLE 25 f = 32.00
F. NO = 1.23
2ω = 29.87
IH = 8.50
TLL = 56.04

| s | r | d | n | ν |
|---|---|---|---|---|
| 1 | 28.9228 | 4.24 | 1.59319 | 67.87 |
| 2 | 198.4893 | 0.10 | | |
| 3 | 25.2661 | 3.45 | 1.59319 | 67.87 |
| 4 | 61.0768 | 0.10 | | |
| 5 | 21.7621 | 5.60 | 1.81600 | 46.62 |
| 6 | 22.6394 | 1.41 | | |
| 7 | 59.8650 | 1.30 | 1.67270 | 32.10 |
| 8 | 10.4447 | 4.02 | | |
| 9 | 0.0000 | 5.42 | | (aperture stop S) |
| 10 | −10.7127 | 1.30 | 1.67270 | 32.10 |
| 11 | 100.4090 | 3.97 | 1.81600 | 46.62 |
| 12 | −19.6771 | 0.10 | | |
| 13 | −237.5005 | 3.65 | 1.75500 | 52.32 |
| 14 | −23.2086 | (d14) | | |
| 15 | 35.4041 | 4.81 | 1.88300 | 40.76 |
| 16 | −38.2481 | 1.50 | 1.80518 | 25.42 |
| 17 | 568.3560 | (d17) | | |
| 18 | 0.0000 | 1.00 | 1.51680 | 64.10 |
| 19 | 0.0000 | 1.50 | | |
| 20 | 0.0000 | 1.87 | 1.51680 | 64.10 |
| 21 | 0.0000 | 0.40 | | |
| 22 | 0.0000 | 0.70 | 1.51680 | 64.10 |
| 23 | 0.0000 | (Bf) | | |

In Example 8, the axial air space d14 between the front-side lens group GF and rear-side lens group GR and the axial air space d17 between the rear-side lens group GR and filter group FL vary upon focusing. The following Table 26 lists values of each group space in states focused at infinity, an intermediate shooting distance, and a short distance, respectively.

TABLE 26

|     | IF     | ID     | SD     |
| --- | ------ | ------ | ------ |
| d14 | 1.2000 | 1.3283 | 3.5662 |
| d17 | 7.9000 | 8.1808 | 9.4651 |
| Bf  | 0.5000 | 0.5000 | 0.5000 |

The following Table 27 lists values corresponding to the conditional expressions in Example 8.

TABLE 27 f = 32.0001
fF = 54.1696
fR = 39.1379
f9 = −44.4583
r8 = 10.4447
n8 = 1.88300
n9 = 1.80518
ν8 = 40.76
ν9 = 25.42
(1) fF/fR = 1.3841
(2) (−f9)/f = 1.3893
(3) r8/f = 0.3264
(4) n8 > n9: 1.88300 > 1.80518
(5) ν8 > ν9: 40.76 > 25.42
(6) fR/f = 1.2231

The following Table 28 lists values corresponding to the conditional expressions in Example 8.

TABLE 28

ν1 = 67.87
ν2 = 67.87
γF1 = −0.4091
γR1 = −0.2808
n1 = 1.59319
n2 = 1.59319
γF2 = −3.9313
γR2 = −1.5651
n8 = 1.88300
n9 = 1.80518
ν8 = 40.76
ν9 = 25.42
r8 = 10.4447
f = 32.0001
fR = 39.1379
(1) (ν1 + ν2)/2 = 67.87
(2) γR1/γF1 = 0.6864
(3) (n1 + n2)/2 = 1.59319
(4) γR2/γF2 = 0.3981
(5) n8 > n9: 1.88300 > 1.80518
(6) ν8 > ν9: 40.76 > 25.42
(7) r8/f = 0.3264
(8) fR/f = 1.2231

Figure 18A:
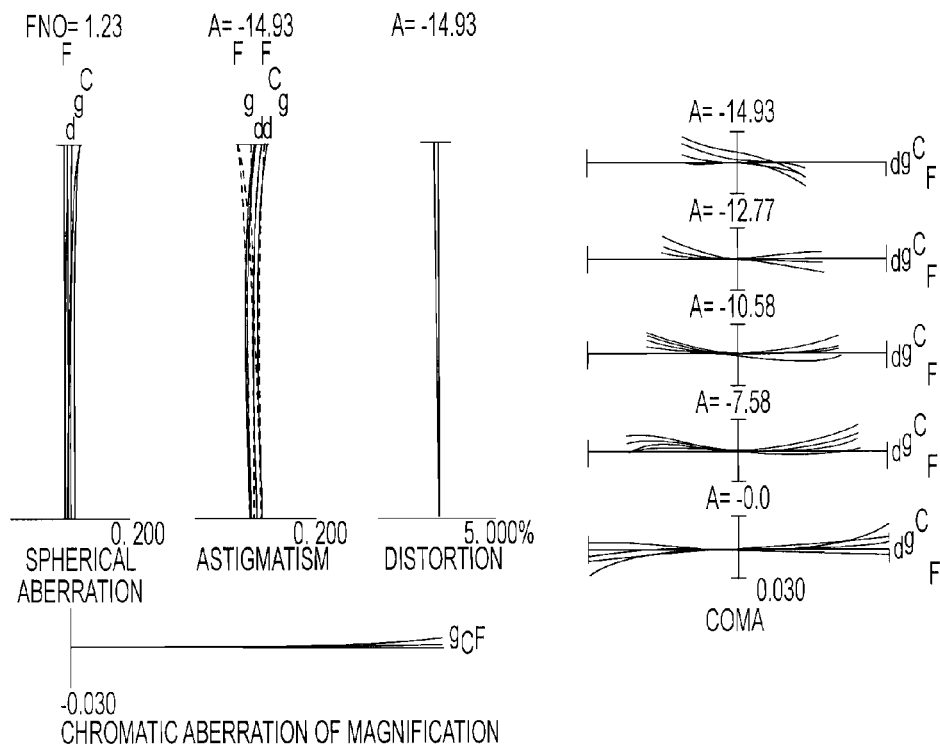
FIG. 18A is an aberration chart in Example 8 showing various aberrations in a state focused at infinity.
Figure 18B:
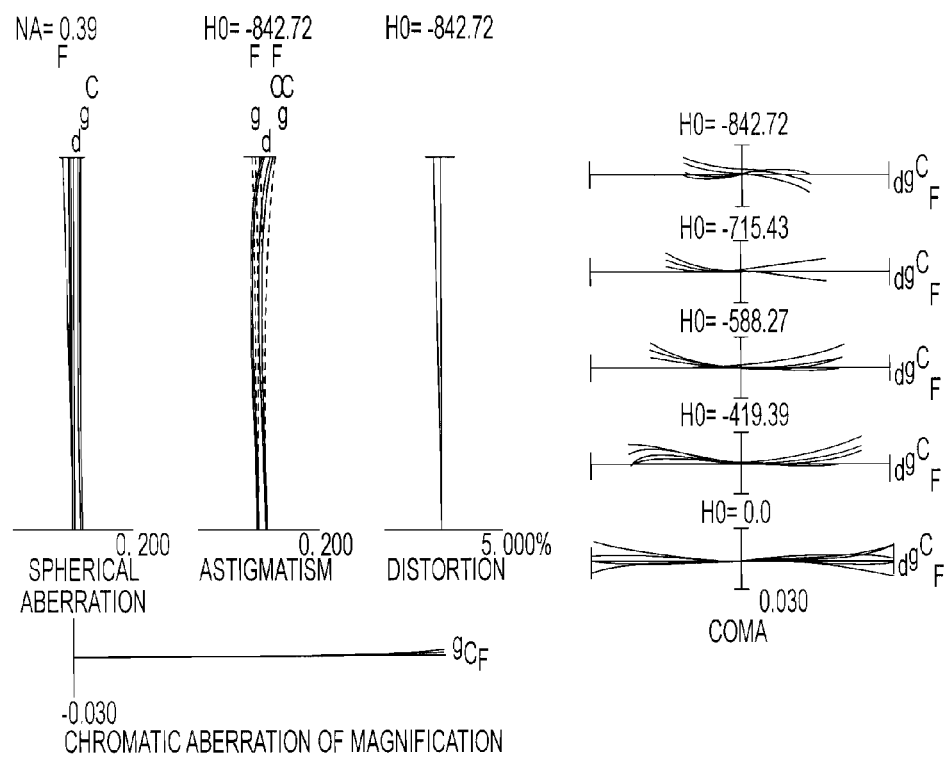
FIG. 18B is an aberration chart in Example 8 showing various aberrations in a state focused at an intermediate shooting distance.
Figure 18C:
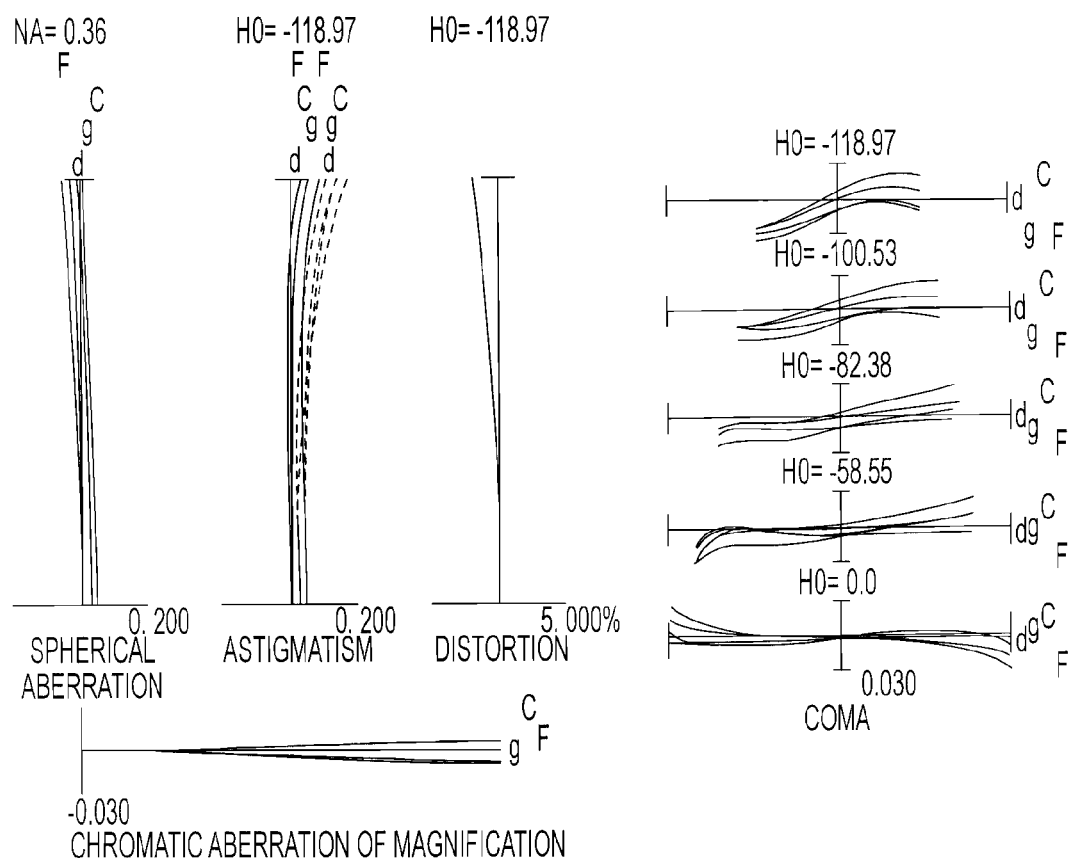
FIG. 18C is an aberration chart in Example 8 showing various aberrations in a state focused at a short distance.

FIG. 18 shows various aberration charts of Example 8. FIG. 18A is an aberration chart showing various aberrations in a state focused at infinity. FIG. 18B is an aberration chart showing various aberrations in a state focused at an intermediate shooting distance with a magnification of −0.01. FIG. 18C is an aberration chart showing various aberrations in a state focused at a short distance with a magnification of −0.07. As can be seen from the aberration charts, various aberrations are favorably corrected in each focus state, whereby Example 8 has excellent image-forming performances.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A lens system comprising:
   on a side closest to an object, a first lens component having a positive refractive power and a second lens component having a positive refractive power in order from the object; and
   on a side closest to an image, a cemented lens constructed by cementing together a positive lens and a negative lens in order from the object;
   wherein the lens system satisfies the following conditional expressions:

$$(n1+n2)/2 > 1.49$$

$$(\nu1+\nu2)/2 > 60$$

where n1 and ν1 denote a refractive index and an Abbe number of the first lens component at d-line, respectively, and n2 and ν2 denote a refractive index and an Abbe number of the second lens component at d-line, respectively, and further comprising:
   a front-side negative lens component having a negative refractive power, an aperture stop, a rear-side negative lens component having a negative refractive power, and a rear-side positive lens component having a positive refractive power in order from the object between the second lens component and the cemented lens.

2. A lens system according to claim 1, wherein each of the first and second lens components has a meniscus form with a convex surface facing the object.

3. A lens system according to claim 1, further comprising a third lens component having a meniscus form with a convex surface facing the object between the second lens component and the front-side negative lens component.

4. A lens system according to claim 1, wherein the front-side negative lens component is a fourth lens component having a meniscus form with a convex surface facing the object, and wherein the rear-side negative lens component is a fifth lens component having a double concave form.

5. A lens system according to claim 1, further comprising a seventh lens component having a positive refractive power between a sixth lens component as the rear-side positive lens component and the cemented lens.

6. A lens system according to claim 1, wherein the rear-side negative lens component and the rear-side positive lens component are cemented together so as to form a cemented lens.

7. A lens system according to claim 1, wherein the lens system satisfies the following conditional expressions:

$$n8 > n9$$

$$\nu8 > \nu9$$

where n8 and ν8 denote a refractive index and an Abbe number of the positive lens in the cemented lens arranged closest to the image at d-line, respectively, and n9 and ν9 denote a refractive index and an Abbe number of the negative lens in the cemented lens arranged closest to the image at d-line, respectively.

8. A lens system according to claim 1, wherein the lens system satisfies the following conditional expression:

$$0.3 < r8/f < 0.5$$

where r8 denotes a radius of curvature of an image-side surface of the front-side negative lens component, and f denotes a focal length of the lens system as a whole.

9. A lens system according to claim 1, wherein the lens system satisfies the following conditional expression:
$$1 < f89/f < 2$$
where f89 denotes a focal length of the cemented lens arranged closest to the image, and f denotes a focal length of the lens system as a whole.

10. A lens system according to claim 1, wherein the positive lens in the cemented lens arranged closest to the image has a double convex form.

11. An optical device including the lens system according to claim 1.

12. A method of manufacturing a lens system, the method comprising the steps of:
- arranging, on a side closest to an object, a first lens component having a positive refractive power and a second lens component having a positive refractive power in order from the object; and
- arranging, on a side closest to an image, a cemented lens constructed by cementing together a positive lens and a negative lens in order from the object;

wherein the lens system satisfies the following conditional expressions:

$$(n1+n2)/2 > 1.49$$

$$(v1+v2)/2 > 60$$

where n1 and v1 denote a refractive index and an Abbe number of the first lens component at d-line, respectively, and n2 and v2 denote a refractive index and an Abbe number of the second lens component at d-line, respectively, and
- wherein the lens system further comprises a front-side negative lens component having a negative refractive power, an aperture stop, a rear-side negative lens component having a negative refractive power, and a rear-side positive lens component having a positive refractive power in order from the object between the second lens component and the cemented lens.

13. A lens system according to claim 1, wherein, upon focusing, the cemented lens arranged closest to the image is moved at a speed different from that of any other lens arranged along an optical axis of the lens system and included in the lens system.

14. The method of manufacturing a lens system according to claim 12, wherein, upon focusing, the cemented lens arranged closest to the image is moved at a speed different from that of any other lens arranged along an optical axis of the lens system and included in the lens system.

* * * * *